United States Patent
Su et al.

(10) Patent No.: US 11,194,231 B2
(45) Date of Patent: Dec. 7, 2021

(54) METHODS AND APPARATUSES FOR STABILIZING A PAYLOAD

(71) Applicant: SZ DJI OSMO TECHNOLOGY CO., LTD., Shenzhen (CN)

(72) Inventors: Tie Su, Shenzhen (CN); Paul Pan, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 235 days.

(21) Appl. No.: 16/656,285

(22) Filed: Oct. 17, 2019

(65) Prior Publication Data
US 2020/0050087 A1   Feb. 13, 2020

Related U.S. Application Data

(63) Continuation of application No. PCT/CN2017/081541, filed on Apr. 21, 2017.

(51) Int. Cl.
H04N 5/232 (2006.01)
G03B 17/56 (2021.01)
F16M 11/12 (2006.01)
F16M 11/18 (2006.01)
F16M 13/04 (2006.01)

(52) U.S. Cl.
CPC ......... *G03B 17/561* (2013.01); *F16M 11/123* (2013.01); *F16M 11/18* (2013.01); *F16M 13/04* (2013.01); *G03B 17/563* (2013.01); *H04N 5/2328* (2013.01)

(58) Field of Classification Search
CPC ........ F16M 11/06; F16M 11/08; F16M 11/10; F16M 11/105; F16M 11/12; F16M 11/121; F16M 11/123; F16M 11/125; F16M 11/126; F16M 11/128; F16M 11/18; F16M 13/02; F16M 13/022; F16M 13/04; G03B 17/561; G03B 17/563; H04N 5/23264;
(Continued)

(56) References Cited

U.S. PATENT DOCUMENTS 9,030,149 B1   5/2015 Chen et al.
2010/0079099 A1*  4/2010 Katsuki ............... A61B 34/71
                                                318/565
(Continued)

FOREIGN PATENT DOCUMENTS

CN   106525074 A   3/2017
WO   2012170673 A1  12/2012
WO   2017000316 A1   1/2017

OTHER PUBLICATIONS

The World Intellectual Property Organization (WIPO) International Search Report and Written Opinion for PCT/CN2017/081541 dated Jan. 19, 2018 7 pages.

*Primary Examiner* — Clayton E. LaBalle
*Assistant Examiner* — Fang-Chi Chang
(74) *Attorney, Agent, or Firm* — Anova Law Group, PLLC

(57) ABSTRACT

A method includes determining an actual orientation of a base of an apparatus, obtaining a target orientation of a payload support of the apparatus, and determining target angular displacements of the payload support about gimbal axes of a plurality of pivoted supports of the apparatus based on the actual orientation of the base and the target orientation of the payload support. The payload support is mounted to the base through the plurality of pivoted supports.

22 Claims, 22 Drawing Sheets

(58) Field of Classification Search
CPC ............ H04N 5/2328; H04N 5/23251; H04N 5/23258
See application file for complete search history.

(56) References Cited

U.S. PATENT DOCUMENTS

| | | |
|---|---|---|
| 2014/0049643 A1 | 2/2014 | Eric et al. |
| 2016/0202704 A1 | 7/2016 | Raymond et al. |
| 2017/0045807 A1 | 2/2017 | Fangming |
| 2020/0133101 A1* | 4/2020 | Su .......................... B64D 47/08 |
| 2020/0332944 A1* | 10/2020 | Su ...................... F16M 11/2071 |
| 2021/0203839 A1* | 7/2021 | Ye ...................... H04N 5/23222 |

* cited by examiner

METHODS AND APPARATUSES FOR STABILIZING A PAYLOAD

CROSS-REFERENCE TO RELATED APPLICATION

This application is a continuation of International Application No. PCT/CN2017/081541, filed Apr. 21, 2017, the entire content of which is incorporated herein by reference.

TECHNICAL FIELD

This disclosure relates to apparatuses and systems for stabilizing the orientation of a payload.

BACKGROUND

A payload such as a camera or other sensors may be mounted to a moving platform such as a person or a vehicle. The motion of the platform may affect the function of the payload. The payload may be stabilized by compensating for the motion of the platform. This compensation is relatively straightforward when the motion of the platform is relatively simple (e.g., within a relatively narrow range); for example, the compensation may be based on the target orientation of the payload using a fixed set of rules. However, when the motion of the platform is less restricted, this compensation may become more complex; for example, the compensation may have to use different sets of rules for different states of the platform.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: determining an actual orientation of a base of an apparatus; obtaining a target orientation of a payload support of the apparatus; and determining target angular displacements of the payload support about gimbal axes of a plurality of pivoted supports of the apparatus, based on the actual orientation of the base and the target orientation of the payload support; where the payload support is mounted to the base through the plurality of pivoted supports. Other embodiments of this aspect include corresponding computer systems, apparatus, and computer programs recorded on one or more computer storage devices, each configured to perform the actions of the methods.

Implementations may include one or more of the following features. The method where the actual orientation of the base is relative to a reference orientation of the base. The method where determining the target angular displacements of the payload support is further based on a reference orientation of the base, where the reference orientation of the base was obtained at a time earlier than determining the actual orientation of the base. The method where the reference orientation of the base and the actual orientation of the base differ by more than 45 degrees, more than 90 degrees, or more than 135 degrees, about an axis. The method further including determining an actual orientation of the payload support, where determining the target angular displacements is further based on the actual orientation of the payload support. The method where determining the actual orientation of the payload support is based on signals of inertial sensors. The method where the inertial sensors include an accelerometer or a gyroscope. The method where determining the target angular displacements of the payload support includes transforming the actual orientation of the payload support with a non-identity function. The method where the non-identity function is a linear function. The method further including determining actual angular displacements of the payload support about the gimbal axes, where determining the target angular displacements is further based on the actual angular displacements. The method where determining the target angular displacements includes determining an actual orientation of the payload support based on the actual angular displacements and the actual orientation of the base. The method where determining the target angular displacements of the payload support includes transforming the actual angular displacements of the payload support with a non-identity function. The method where the non-identity function is a linear function. The method where determining the actual orientation of the base is based on signals of inertial sensors. The method where the inertial sensors include an accelerometer or a gyroscope. The method where determining the actual orientation of the base is based on an actual orientation of the payload support and actual angular displacements of the payload support about the gimbal axes. The method where the plurality of pivoted supports comprise three pivoted supports, the gimbal axes thereof being mutually orthogonal. The method where the base is configured to be mounted to a handle assembly including a handle configured to be held by a person's hand. The method where the target orientation of the payload support is determined upon powering the apparatus. The method where the base is configured to be mounted on a vehicle. The method where the payload support is configured to support a camera. The method further including changing the target orientation of the payload support. The method further including rotating the pivoted supports to the target angular displacements of the payload support. The method where determining the target angular displacements of the payload support includes transforming the target orientation of the payload support with a non-identity function, transforming the actual orientation of the base with a non-identity function, transforming the target angular displacements of the payload support with a non-identity function, or a combination thereof. The method where the non-identity function is a linear function. The computer program product where the actual orientation of the base is relative to a reference orientation of the base. The computer program product where determining the target angular displacements of the payload support is further based on a reference orientation of the base, where the reference orientation of the base was obtained at a time earlier than determining the actual orientation of the base. The computer program product where reference orientation of the base and the actual orientation of the base differ by more than 45 degrees, more than 90 degrees, or more than 135 degrees, about an axis. The computer program product where the method further includes determining an actual orientation of the payload support, where determining the target angular displacements is further based on the actual orientation of the payload support. The computer program product where determining the target angular displacements of the payload support includes transforming the actual orientation of the payload support with a non-identity function. The computer program product where the non-identity function is a linear function. The computer program product where determining the actual orientation of the base is based on an actual orientation of the payload support and actual angular displacements of the payload support about the gimbal axes. The computer program product where determining the target angular displacements of the payload support includes transforming the actual angular displacements of the payload support with a non-identity function. The computer program product where the non-identity function is a linear function. The computer program product where the target orientation of the payload support is determined upon powering the apparatus. The computer program product where determining the target angular displacements of the payload support includes transforming the target orientation of the payload support with a non-identity function, transforming the actual orientation of the base with a non-identity function, transforming the target angular displacements of the payload support with a non-identity function, or a combination thereof. The computer program product where the non-identity function is a linear function. The apparatus where the pivoted supports comprise three pivoted supports, the gimbal axes thereof being mutually orthogonal. The apparatus further including one or more inertial sensors on the base, the pivoted supports, the payload support, or a combination thereof. The apparatus further including a handle assembly, the handle assembly including a first handle configured to be held by a person's hand. The apparatus where the handle assembly further includes a bar, a second handle and a third handle, where the first handle is positioned between the second handle and the third handle and the first, second and third handles are attached to the bar. The apparatus where a center of gravity of the apparatus and the first handle are on different sides of the bar. The apparatus where the base is configured to be mounted on a vehicle. The apparatus where the payload support is configured to support a camera. The apparatus where the actual orientation of the base is relative to a reference orientation of the base. The apparatus where the processor is configured to determine the target angular displacements of the payload support further based on a reference orientation of the base, where the reference orientation of the base was obtained at a time earlier than determining the actual orientation of the base. The apparatus where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The apparatus where the non-identity function is a linear function. The vehicle where the vehicle is an aerial vehicle. The vehicle where the vehicle is an unmanned aerial vehicle. The vehicle where the vehicle is a land vehicle or a watercraft. The vehicle where the actual orientation of the base is relative to a reference orientation of the base. The vehicle where the processor is configured to determine the target angular displacements of the payload support further based on a reference orientation of the base, where the reference orientation of the base was obtained at a time earlier than determining the actual orientation of the base. The vehicle where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The vehicle where the non-identity function is a linear function. The system where the inertial sensors include an accelerometer or a gyroscope. The system further including sensors configured to determine actual angular displacements of the payload support about the gimbal axes, where the processor is configured to determine the target angular displacements of the payload support about the gimbal axes further based on the actual angular displacements. The system where the processor is configured to cause the pivoted supports to rotate to the target angular displacements of the payload support. The system where the actual orientation of the base is relative to a reference orientation of the base. The system where the processor is configured to determine the target angular displacements of the payload support further based on a reference orientation of the base, where the reference orientation of the base was obtained at a time earlier than determining the actual orientation of the base. The system where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The system where the non-identity function is a linear function. Implementations of the described techniques may include hardware, a method or process, or computer software on a computer-accessible medium.

One general aspect includes a computer program product including a non-transitory computer readable medium having instructions recorded thereon, the instructions when executed by a computer system implementing a method including: determining an actual orientation of a base of an apparatus; obtaining a target orientation of a payload support of the apparatus; and determining target angular displacements of the payload support about gimbal axes of a plurality of pivoted supports of the apparatus, based on the actual orientation of the base and the target orientation of the payload support; where the payload support is mounted to the base through the plurality of pivoted supports. Other embodiments of this aspect include corresponding computer systems, apparatus, and computer programs recorded on one or more computer storage devices, each configured to perform the actions of the methods.

Implementations may include one or more of the following features. The computer program product where the actual orientation of the base is relative to a reference orientation of the base. The computer program product where determining the target angular displacements of the payload support is further based on a reference orientation of the base, where the reference orientation of the base was obtained at a time earlier than determining the actual orientation of the base. The computer program product where reference orientation of the base and the actual orientation of the base differ by more than 45 degrees, more than 90 degrees, or more than 135 degrees, about an axis. The computer program product where the method further includes determining an actual orientation of the payload support, where determining the target angular displacements is further based on the actual orientation of the payload support. The computer program product where determining the target angular displacements of the payload support includes transforming the actual orientation of the payload support with a non-identity function. The computer program product where the non-identity function is a linear function. The computer program product where determining the actual orientation of the base is based on an actual orientation of the payload support and actual angular displacements of the payload support about the gimbal axes. The computer program product where determining the target angular displacements of the payload support includes transforming the actual angular displacements of the payload support with a non-identity function. The computer program product where the non-identity function is a linear function. The computer program product where the target orientation of the payload support is determined upon powering the apparatus. The computer program product where determining the target angular displacements of the payload support includes transforming the target orientation of the payload support with a non-identity function, transforming the actual orientation of the base with a non-identity function, transforming the target angular displacements of the payload support with a non-identity function, or a combination thereof. The computer program product where the non-identity function is a linear function. The apparatus where the pivoted supports comprise three pivoted supports, the gimbal axes thereof being mutually orthogonal. The apparatus further including one or more inertial sensors on the base, the pivoted supports, the payload support, or a combination thereof. The apparatus further including a handle assembly, the handle assembly including a first handle configured to be held by a person's hand. The apparatus where the handle assembly further includes a bar, a second handle and a third handle, where the first handle is positioned between the second handle and the third handle and the first, second and third handles are attached to the bar. The apparatus where a center of gravity of the apparatus and the first handle are on different sides of the bar. The apparatus where the base is configured to be mounted on a vehicle. The apparatus where the payload support is configured to support a camera. The apparatus where the actual orientation of the base is relative to a reference orientation of the base. The apparatus where the processor is configured to determine the target angular displacements of the payload support further based on a reference orientation of the base, where the reference orientation of the base was obtained at a time earlier than determining the actual orientation of the base. The apparatus where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The apparatus where the non-identity function is a linear function. The vehicle where the vehicle is an aerial vehicle. The vehicle where the vehicle is an unmanned aerial vehicle. The vehicle where the vehicle is a land vehicle or a watercraft. The vehicle where the actual orientation of the base is relative to a reference orientation of the base. The vehicle where the processor is configured to determine the target angular displacements of the payload support further based on a reference orientation of the base, where the reference orientation of the base was obtained at a time earlier than determining the actual orientation of the base. The vehicle where the processor is configured to determine the target angular displacements of the payload support by transforming the target orientation of the payload support with a non-identity function, transforming the actual orientation of the base with a non-identity function, transforming the target angular displacements of the payload support with a nonidentity function, or a combination thereof. The vehicle where the non-identity function is a linear function. The system where the inertial sensors include an accelerometer or a gyroscope. The system further including sensors configured to determine actual angular displacements of the payload support about the gimbal axes, where the processor is configured to determine the target angular displacements of the payload support about the gimbal axes further based on the actual angular displacements. The system where the processor is configured to cause the pivoted supports to rotate to the target angular displacements of the payload support. The system where the actual orientation of the base is relative to a reference orientation of the base. The system where the processor is configured to determine the target angular displacements of the payload support further based on a reference orientation of the base, where the reference orientation of the base was obtained at a time earlier than determining the actual orientation of the base. The system where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The system where the non-identity function is a linear function. Implementations of the described techniques may include hardware, a method or process, or computer software on a computer-accessible medium.

One general aspect includes an apparatus including: a base; a payload support; a plurality of pivoted supports, where the payload support is mounted to the base through the plurality of pivoted supports; a plurality of motors configured to rotate the pivoted supports about gimbal axes thereof; a processor configured to determine an actual orientation of the base, to obtain a target orientation of the payload support, to determine target angular displacements of the payload support about the gimbal axes based on the actual orientation of the base and the target orientation of the payload support, and to rotate the pivoted supports to the target angular displacements using the motors. Other embodiments of this aspect include corresponding computer systems, apparatus, and computer programs recorded on one or more computer storage devices, each configured to perform the actions of the methods.

Implementations may include one or more of the following features. The apparatus where the pivoted supports comprise three pivoted supports, the gimbal axes thereof being mutually orthogonal. The apparatus further including one or more inertial sensors on the base, the pivoted supports, the payload support, or a combination thereof. The apparatus further including a handle assembly, the handle assembly including a first handle configured to be held by a person's hand. The apparatus where the handle assembly further includes a bar, a second handle and a third handle, where the first handle is positioned between the second handle and the third handle and the first, second and third handles are attached to the bar. The apparatus where a center of gravity of the apparatus and the first handle are on different sides of the bar. The apparatus where the base is configured to be mounted on a vehicle. The apparatus where the payload support is configured to support a camera. The apparatus where the actual orientation of the base is relative to a reference orientation of the base. The apparatus where the processor is configured to determine the target angular displacements of the payload support further based on a reference orientation of the base, where the reference orientation of the base was obtained at a time earlier than determining the actual orientation of the base. The apparatus where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The apparatus where the non-identity function is a linear function. The vehicle where the vehicle is an aerial vehicle. The vehicle where the vehicle is an unmanned aerial vehicle. The vehicle where the vehicle is a land vehicle or a watercraft. The vehicle where the actual orientation of the base is relative to a reference orientation of the base. The vehicle where the processor is configured to determine the target angular displacements of the payload support further based on a reference orientation of the base, where the reference orientation of the base was obtained at a time earlier than determining the actual orientation of the base. The vehicle where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The vehicle where the non-identity function is a linear function. The system where the inertial sensors include an accelerometer or a gyroscope. The system further including sensors configured to determine actual angular displacements of the payload support about the gimbal axes, where the processor is configured to determine the target angular displacements of the payload support about the gimbal axes further based on the actual angular displacements. The system where the processor is configured to cause the pivoted supports to rotate to the target angular displacements of the payload support. The system where the actual orientation of the base is relative to a reference orientation of the base. The system where the processor is configured to determine the target angular displacements of the payload support further based on a reference orientation of the base, where the reference orientation of the base was obtained at a time earlier than determining the actual orientation of the base. The system where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The system where the non-identity function is a linear function. Implementations of the described techniques may include hardware, a method or process, or computer software on a computer-accessible medium.

One general aspect includes a vehicle including: a base mounted to the vehicle; a payload support; a plurality of pivoted supports, where the payload support is mounted to the base through the plurality of pivoted supports; a plurality of motors configured to rotate the pivoted supports about gimbal axes thereof; a processor configured to determine an actual orientation of the base, to obtain a target orientation of the payload support, to determine target angular displacements of the payload support about the gimbal axes based on the actual orientation of the base and the target orientation of the payload support, and to rotate the pivoted supports to the target angular displacements using the motors. Other embodiments of this aspect include corresponding computer systems, apparatus, and computer programs recorded on one or more computer storage devices, each configured to perform the actions of the methods.

Implementations may include one or more of the following features. The vehicle where the vehicle is an aerial vehicle. The vehicle where the vehicle is an unmanned aerial vehicle. The vehicle where the vehicle is a land vehicle or a watercraft. The vehicle where the actual orientation of the base is relative to a reference orientation of the base. The vehicle where the processor is configured to determine the target angular displacements of the payload support further based on a reference orientation of the base, where the reference orientation of the base was obtained at a time earlier than determining the actual orientation of the base. The vehicle where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The vehicle where the non-identity function is a linear function. The system where the inertial sensors include an accelerometer or a gyroscope. The system further including sensors configured to determine actual angular displacements of the payload support about the gimbal axes, where the processor is configured to determine the target angular displacements of the payload support about the gimbal axes further based on the actual angular displacements. The system where the processor is configured to cause the pivoted supports to rotate to the target angular displacements of the payload support. The system where the actual orientation of the base is relative to a reference orientation of the base. The system where the processor is configured to determine the target angular displacements of the payload support further based on a reference orientation of the base, where the reference orientation of the base was obtained at a time earlier than determining the actual orientation of the base. The system where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The system where the non-identity function is a linear function. Implementations of the described techniques may include hardware, a method or process, or computer software on a computer-accessible medium.

One general aspect includes a system including: inertial sensors mounted to a portion of an apparatus, the portion being a base of the apparatus, a payload support of the apparatus, or a plurality of pivoted supports of the apparatus, the inertial sensors configured to measure characteristics of movement of the portion, where the payload support is mounted to the base through the plurality of pivoted supports; a processor configured to determine an actual orientation of the base using data from the inertial sensors, configured to determine a target orientation of the payload support, and configured to determine target angular displacements of the payload support about gimbal axes of the plurality of pivoted supports, based on the actual orientation of the base and the target orientation of the payload support. Other embodiments of this aspect include corresponding computer systems, apparatus, and computer programs recorded on one or more computer storage devices, each configured to perform the actions of the methods.

Implementations may include one or more of the following features. The system where the inertial sensors include an accelerometer or a gyroscope. The system further including sensors configured to determine actual angular displacements of the payload support about the gimbal axes, where the processor is configured to determine the target angular displacements of the payload support about the gimbal axes further based on the actual angular displacements. The system where the processor is configured to cause the pivoted supports to rotate to the target angular displacements of the payload support. The system where the actual orientation of the base is relative to a reference orientation of the base. The system where the processor is configured to determine the target angular displacements of the payload support further based on a reference orientation of the base, where the reference orientation of the base was obtained at a time earlier than determining the actual orientation of the base. The system where the processor is configured to determine the target angular displacements of the payload support by transforming the target orientation of the payload support with a non-identity function, transforming the actual orientation of the base with a non-identity function, transforming the target angular displacements of the payload support with a non-identity function, or a combination thereof. The system where the non-identity function is a linear function. Implementations of the described techniques may include hardware, a method or process, or computer software on a computer-accessible medium.

DETAILED DESCRIPTION

Figure 1A:
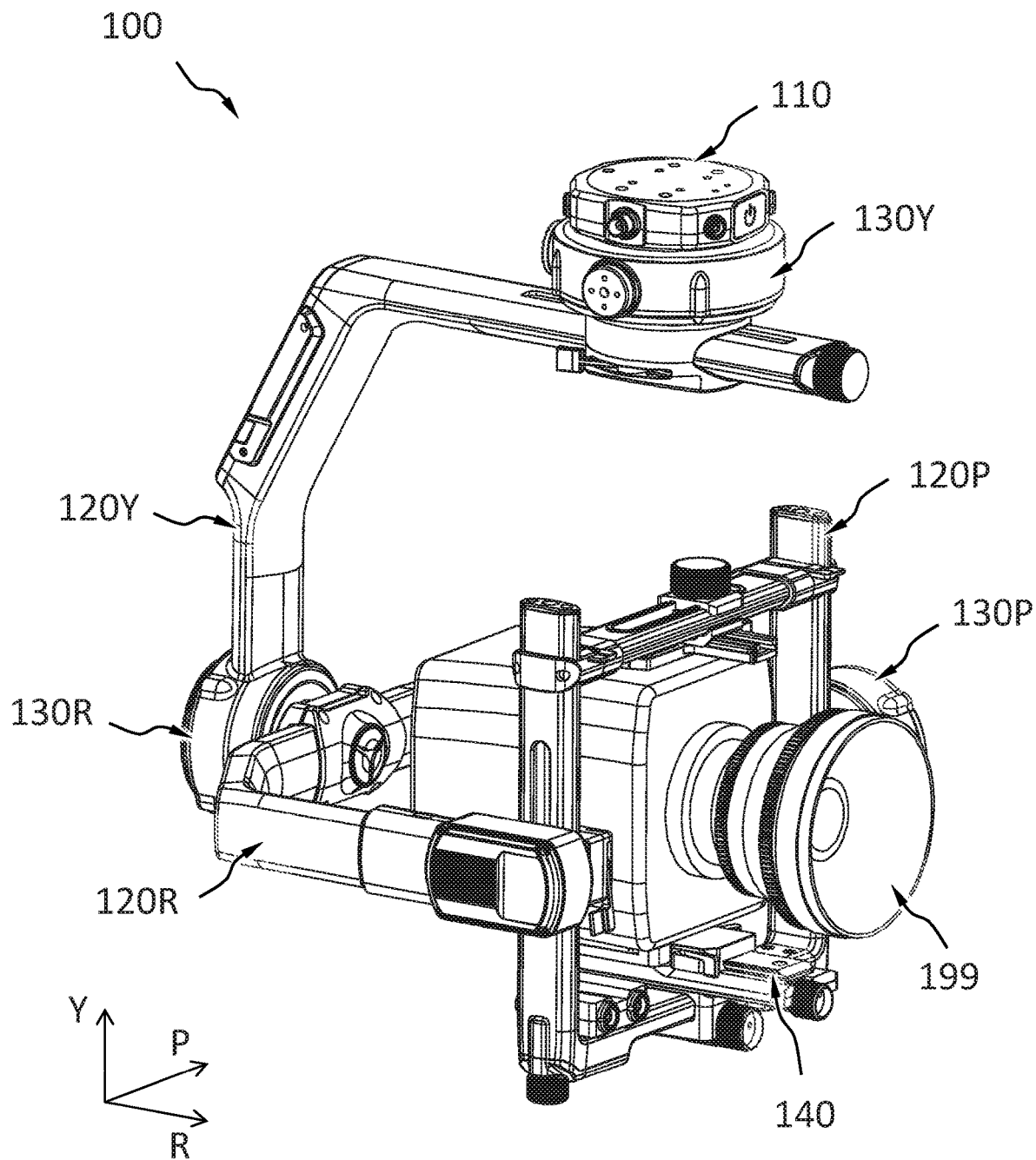
FIG. 1A schematically shows an apparatus configured to stabilize a payload.

When a payload is mounted to a base and the base is not stationary, the motion of the base is transferred to the payload if the payload is not stabilized. The motion of the payload may adversely affect the performance of the payload. For example, if the payload is a camera, motion of the payload may blur images it acquires. Stabilization of the payload reduces or eliminates motion transfer from the base to the payload. One type of stabilization is damping, where the payload is mounted to the base through one or more dampers such as a cylinder filled with a fluid. Another type of stabilization is compensation, where the payload is moved in a direction opposite to the direction of motion of the base, thereby canceling the motion of the base and reducing or eliminating the net motion of the payload.

A payload may be stabilized by compensation for translational motion or compensation for rotational motion of the base. One or both types of compensation may be beneficial depending on the function of the payload. For example, if the payload is a camera that captures images of a scene far away from the camera, compensation for rotational motion is much more important than compensation for translational motion.

Compensation for rotational motion may be achieved using a gyroscope mounted on a plurality (e.g., two or three) of pivoted supports. The term "orientation" of an object as used in this disclosure is with respect to a frame of reference that does not move with the object ("the absolute frame of reference"). One of the oldest forms of gyroscopes is a spinning wheel or disc in which the axis of rotation is free to assume any orientation by itself. When rotating, the orientation of this axis is unaffected by tilting or rotation of a base the wheel or disc is mounted to, according to the conservation of angular momentum. Gyroscopes based on other operating principles also exist, such as the electronic, microchip-packaged MEMS gyroscopes found in consumer electronics devices, solid-state ring lasers, fiber optic gyroscopes, and quantum gyroscopes. A pivoted support (also referred to as a gimbal) is a mechanism that allows the rotation of an object (e.g., a gyroscope) about a single axis (the "gimbal axis"). A set of three pivoted supports, one mounted on the other with different (e.g., mutually orthogonal) gimbal axes, may be used to allow an object mounted on the innermost pivoted support to remain independent of the rotation of its support.

If the orientation of the payload need change, the payload may be mounted to its base through a plurality of pivoted supports that can be actively rotated (e.g., by motors). The orientation of the payload may be changed to or stabilized at a target orientation by rotating the pivoted supports. The angular displacements of the pivoted supports needed to achieve the target orientation of the payload may depend on the target orientation of the payload and the actual orientation of the base. For different actual orientations of the base, different angular displacements of the pivoted supports may be needed to achieve the same target orientation of the payload. In an example, the orientation of the base may be categorized into a number of modes and for each mode a different set of functions are used to derive the angular displacements of the pivoted supports needed to achieve the target orientation of the payload.

FIG. 1A schematically shows an apparatus 100 configured to stabilize a payload 199. The apparatus 100 includes a base 110, a payload support 140, at least three pivoted supports 120Y, 120R and 120P (collectively pivoted supports 120), and motors 130Y, 130R and 130P (collectively motors 130) configured to rotate the pivoted supports 120Y, 120R and 120P, respectively. The payload support 140 is configured to receive the payload 199. For example, the payload support 140 may include various mechanical structures such as slots, clips and screws that can receive to the payload 199. The payload support 140 may include inertial sensors (e.g., an accelerometer and a gyroscope) configured to measure the actual orientation of the payload support 140. The payload 199 may be a sensor such as a camera. The camera may capture still images or videos. The payload 199 may be other types of sensors such as a spectrometer, a microwave antenna of a radar, and a laser of a LIDAR. The payload support 140 is mounted to the base 110 through the pivoted supports 120Y, 120R and 120P. The pivoted supports 120Y, 120R and 120P may rotate along their respective gimbal axes Y, R and P. The gimbal axes of the pivoted supports 120Y, 120R and 120P may be mutually orthogonal. In this example, the payload support 140 is directly mounted to the pivoted support 120P; the pivoted support 120P is directly mounted to the pivoted support 120R; the pivoted support 120R is directly mounted to the pivoted support 120Y; the pivoted support 120Y is directly mounted to the base 110. Other orders of arrangement of the pivoted supports 120 are possible. The base 110 may be mounted to a handle assembly or a vehicle such as an aerial vehicle (manned or unmanned), a land vehicle or a watercraft. The apparatus 100 may receive electric power and transmit electric signals through the base 110. The apparatus 100 may transmit electric signals wirelessly.

The pivoted supports 120 may have any suitable material such as a metal, a plastic, and a composite. The pivoted supports 120 may be substantially rigid. The pivoted supports 120 may have any shape. The pivoted supports 120 may have straight or curved sections joined together. The pivoted supports 120 may be hollow to allow passage of cables therethrough. In an embodiment, the pivoted supports 120 may have a substantially Y shape or U shape.

FIG. 1B-FIG. 1J schematically show the apparatus 100 in detail, according to an embodiment.

Figure 1B:
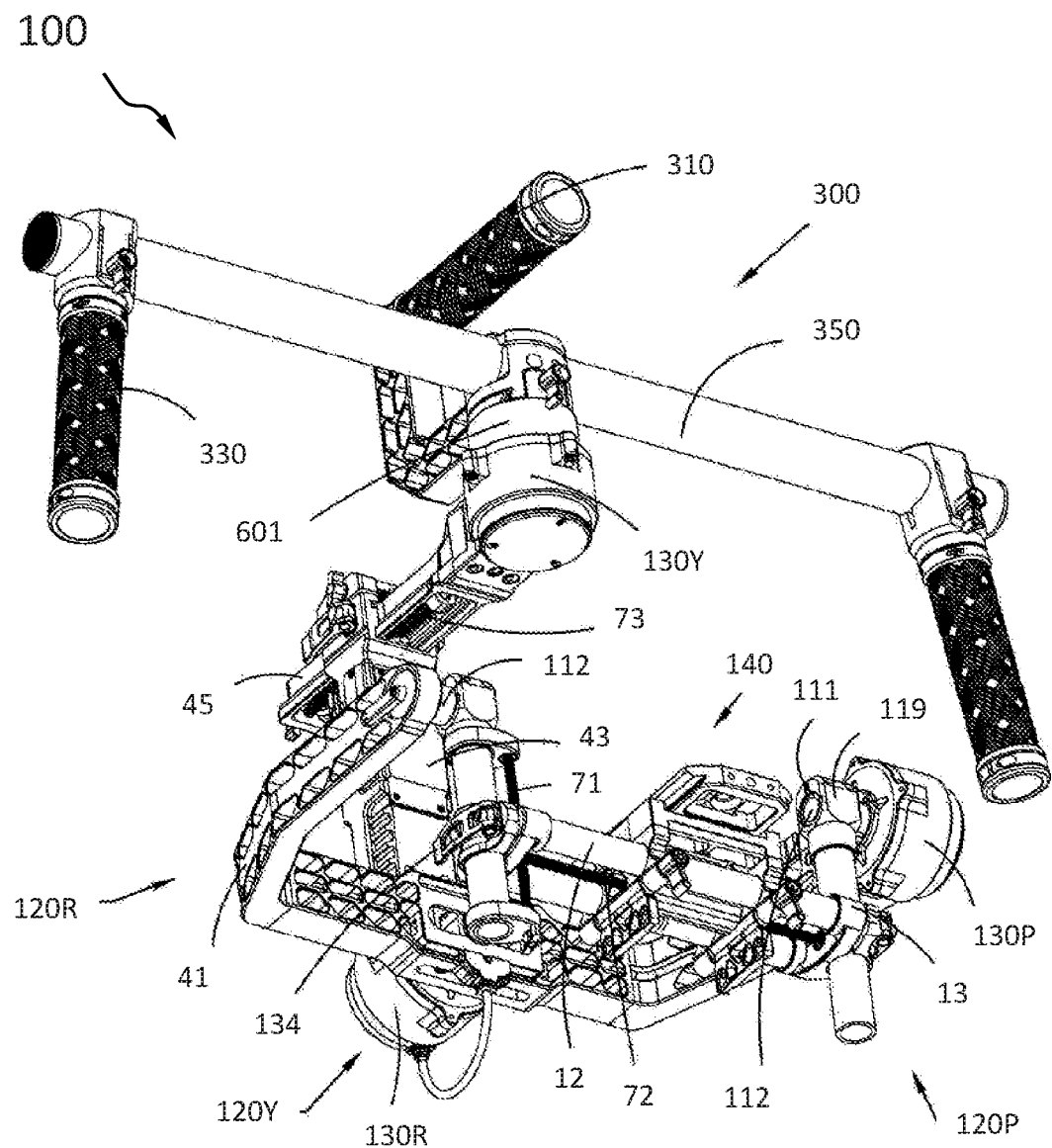
FIG. 1B schematically shows a perspective view of an apparatus configured to stabilize a payload.
Figure 1C:
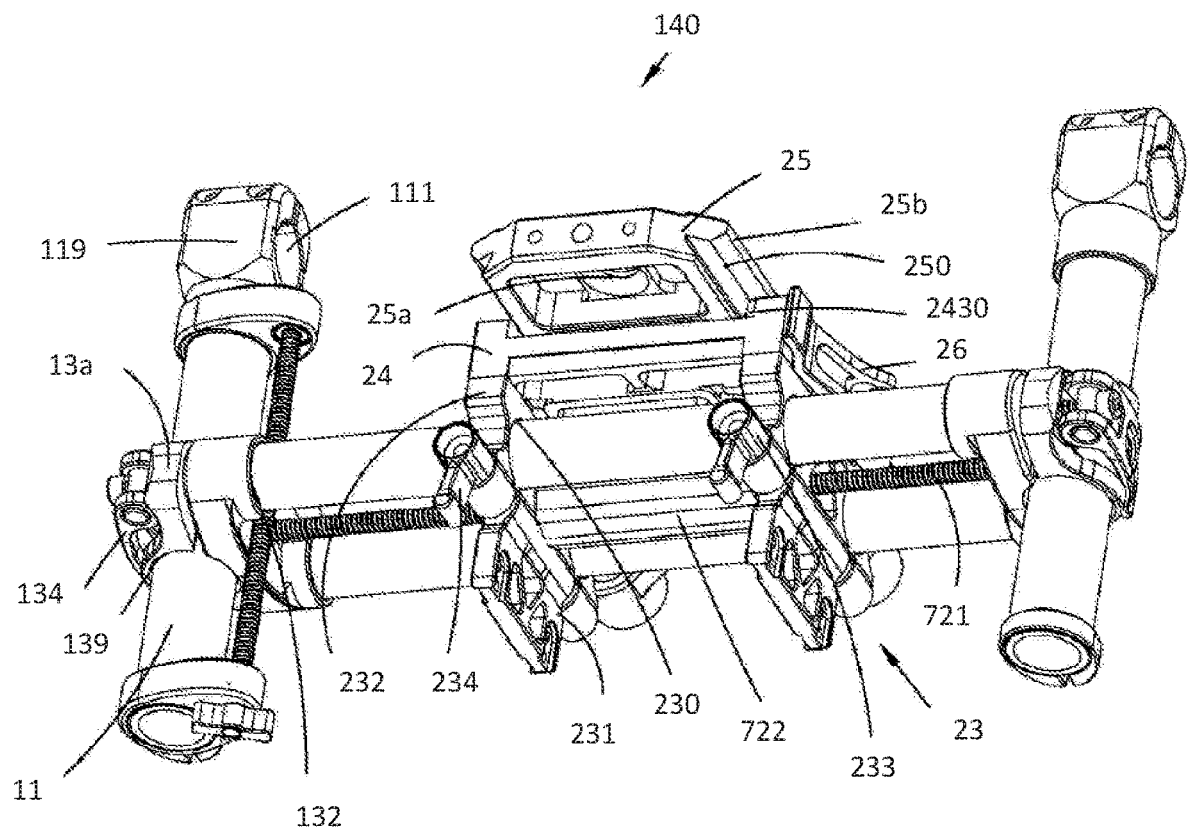
FIG. 1C schematically shows a perspective view of a first pivoted support, a payload support and a first center of gravity adjustment assembly, in FIG. 1B.

FIG. 1B and FIG. 1C schematically show the apparatus 100 for carrying the payload 199, in an embodiment. The payload 199 may be a camera, a camera, a lens, or the like.

In an embodiment, the apparatus 100 includes the pivoted support 120P, the payload support 140 movably disposed on the first pivoted support 120P, the pivoted support 120R pivotally connected to the pivoted support 120P, the pivoted support 120Y pivotally connected to the pivoted support 120P, and the motors 130P, 130R and 130Y configured to rotate the pivoted support 120P, pivoted support 120R and pivoted support 120Y, respectively, a handle assembly 300, and three center-of-gravity adjustment assemblies 71, 72 and 73.

In an embodiment, the pivoted support 120P includes two first struts 11, two guide posts 12 and two first seating devices 13. The two guide posts 12 are arranged perpendicularly to the first struts 11. The guide posts 12 are movable along the longitudinal direction of the first struts 11, and fixed to any position along the first struts 11 by a first seating device 13.

In an embodiment, the first struts 11 may have a cylindrical shape, and each of the first struts 11 includes a connecting end 119. The connecting end 119 is provided with a through hole 111. The axial direction of the through hole 111 is substantially perpendicular to the longitudinal direction of the first struts 11. One of the through holes 111 is provided with a rotation shaft 112.

In an embodiment, the two guide posts 12 are cylindrical.

In an embodiment, the first seating device 13 comprises a loop 13a and a lock attachment 134. The loop 13a is provided with a locking hole 139, two housing portions 132 on both sides of the locking hole 139, and a first screw hole 136. The axial direction of the locking hole 139 is substantially perpendicular to the axial direction of the housing portions 132. The shape and size of the locking holes 139 correspond to the shape and size of the first struts 11. The first struts 11 may be housed in the locking hole 139. Each of the housing portions 132 is for accommodating one end of the guide posts 12 so that the guide posts 12 are arranged substantially in parallel. The axial direction of the first screw hole 136 is substantially perpendicular to the axial direction of the housing portions 132.

In an embodiment, the lock attachment 134 is used to lock the first seating device 13 to any position of the first struts 11. In particular, the lock attachment 134 is a clip, which may be made from a metal. The lock attachment 134 is capable of applying pressure to the loop 13a such that the locking hole 139 of the loop 13a is reduced in diameter to clamp the first struts 11. It is possible to adjust the mounting position of the two guide posts 12 on the first struts 11 by releasing or tightening the lock attachment 134.

In an embodiment, the payload support 140 includes two first adapters 23 slidably disposed on the guide posts 12, a mounting plate 24, a support plate 25 slidably disposed on the mounting plate 24, and a depressing device 26. The mounting plate 24 is fixed to the first adapter 23. The mounting plate 24 is fixed to the first adapters 23 by bolts. The support plate 25 is slidably provided on the mounting plate 24. The depressing device 26 is provided on one side of the mounting plate 24 for fixing the support plate 25 to any position of the mounting plate 24.

In an embodiment, each of the first adapters 23 comprises a first press bar 231 and a second press bar 232, which allow adjustment of the sliding of the first adapter 23. Two circular slots 230 are formed between the first press bar 231 and the second press bar 232. The circular slots 230 can accommodate the guide posts 12 therein. A first screw 233 locks the first press bar 231 and the second press bar 232 together. Locking the first screw 233 fixes the first adapter 23 to the guide posts 12; releasing the first screw 233 allows sliding of the first adapter 23 along the longitudinal direction of the guide posts 12.

In an embodiment, the nut of the first screw 233 is fixed to a first wrench 234, which extends in a direction perpendicular to the longitudinal direction of the first screw 233. Turning the first wrench 234 in a direction can tighten the first screw 233; turning the first wrench 234 in an opposite direction can loosen the first screw 233, thereby allowing fixation and sliding of first adapter 23.

In an embodiment, the mounting plate 24 is fixed to the second press bar 232. The mounting plate 24 is provided with a first chute 2430.

In an embodiment, the support plate 25 is provided with a plurality of uniformly spaced screw holes 25a along the length of the support plate 25, for screwing the payload 199. The payload 199 may be adapted to a plurality of different sizes of the payload 199 by means of a plurality of the screw holes 25a. The screw holes 25a may be used to adjust the position of the payload 199 on the support plate 25. The outer sidewalls 25b of the support plate 25 are provided with a second chute 250 corresponding to the first chute 2430 at the position corresponding to the first chute 2430. The second chute 250 may be a dovetail chute.

In an embodiment, the depressing device 26 may be used to effect the locking and release between the support plate 25 and the mounting plate 24, thereby adjusting the sliding and fixing of the support plate 25 on the mounting plate 24.

In an embodiment, the pivoted support 120R includes two second struts 41, the motor 130P, and a connecting post 41a connecting the two second struts 41. The two second struts 41 and the connecting post 41a together form a U-shaped structure. The second struts 41 are arranged substantially parallel to each other, wherein one of the second struts 41 is directly connected to the rotation shaft 112 of one of the first struts 11 and the other of the second struts 41, through the motor 130P, is pivotally connected to the through hole 111 of the other first strut 11. Specifically, the motor 130P is fixed to one end of the second strut 41 near the first strut 11, and a drive shaft of the motor 130P is connected to the through hole 111 of the first strut 11 to rotate the first pivoted support 120P. The axial direction of the drive shaft of the motor 130P is substantially perpendicular to the longitudinal direction of the second strut 41. The motor 130P drives the first pivoted support 120P to rotate to adjust the orientation of the payload 199. The motor 130P may be a brushless motor.

In an embodiment, the third pivoted support 120Y includes a third strut 43, the motor 130R, and a connecting plate 45. The third strut 43 has a hollow columnar shape. The motor 130R is rotatably connected to the connecting post 41a for rotating the pivoted support 120R. Specifically, the motor 130R is fixed to one end of the third strut 43, and the drive shaft (not shown) of the motor 130R is fixed to the second strut 41 for rotating the second strut 41 of the pivoted support 120R. The other end of the third strut 43 is connected to the connecting plate 45. The connecting plate 45 is substantially perpendicular to the third strut 43 and is substantially parallel to the axis of rotation of the motor 130R.

In an embodiment, the motor 130Y may be a brushless motor whose rotor is connected to the connecting plate 45 and whose stator is fixed to the handle assembly 300. The motor 130Y is for rotating the third pivoted support 120Y.

In an embodiment, the handle assembly 300 may be folded in a rod shape. Specifically, the handle assembly 300 includes a first connecting portion 601, a bar 350, and a third handle 330. The bar 350 is a rod member, and the first connection portion 601 is fixedly connected to the geometric center of the bar 350. The first connecting portion 601 is connected to the motor 130Y.

In an embodiment, the third handle 330 is a cylindrical handle, and fixed to the bar 350.

In an embodiment, the handle assembly 300 has a first handle 310, and the first handle 310 is fixed to the bar 350 at a side of the first connection portion 601. The handle assembly 300 may have a locking mechanism for mounting to a ladder to effect automatic movement of the apparatus 100.

In an embodiment, the three center-of-gravity adjustment assemblies are a first center-of-gravity adjustment assembly 71, a second center-of-gravity adjustment assembly 72, and a third center-of-gravity adjustment assembly 73, respectively.

Figure 1D:
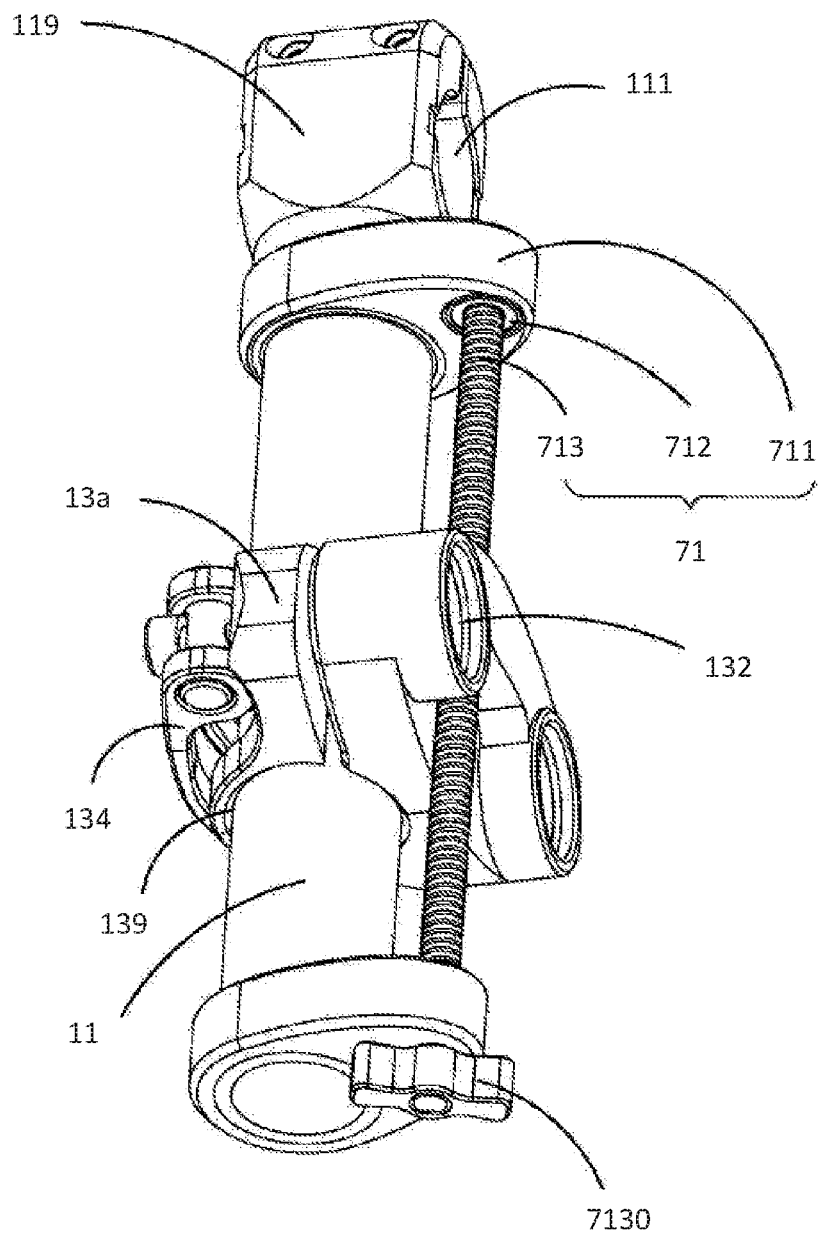
FIG. 1D schematically shows a perspective view of a first post and the first center of gravity adjustment assembly in FIG. 1C.
Figure 1E:
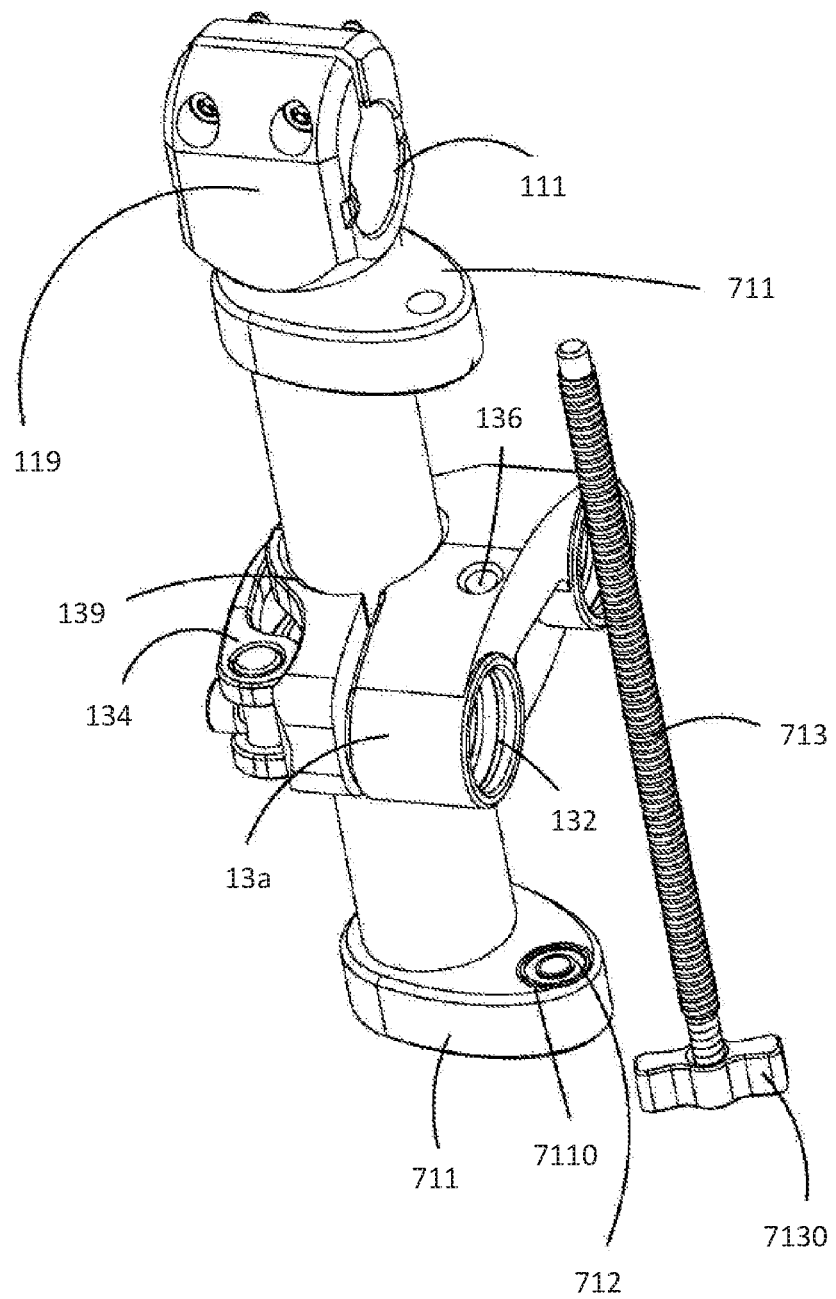
FIG. 1E schematically shows an exploded view of the first post and the first center of gravity adjustment assembly in FIG. 1D.
Figure 1F:
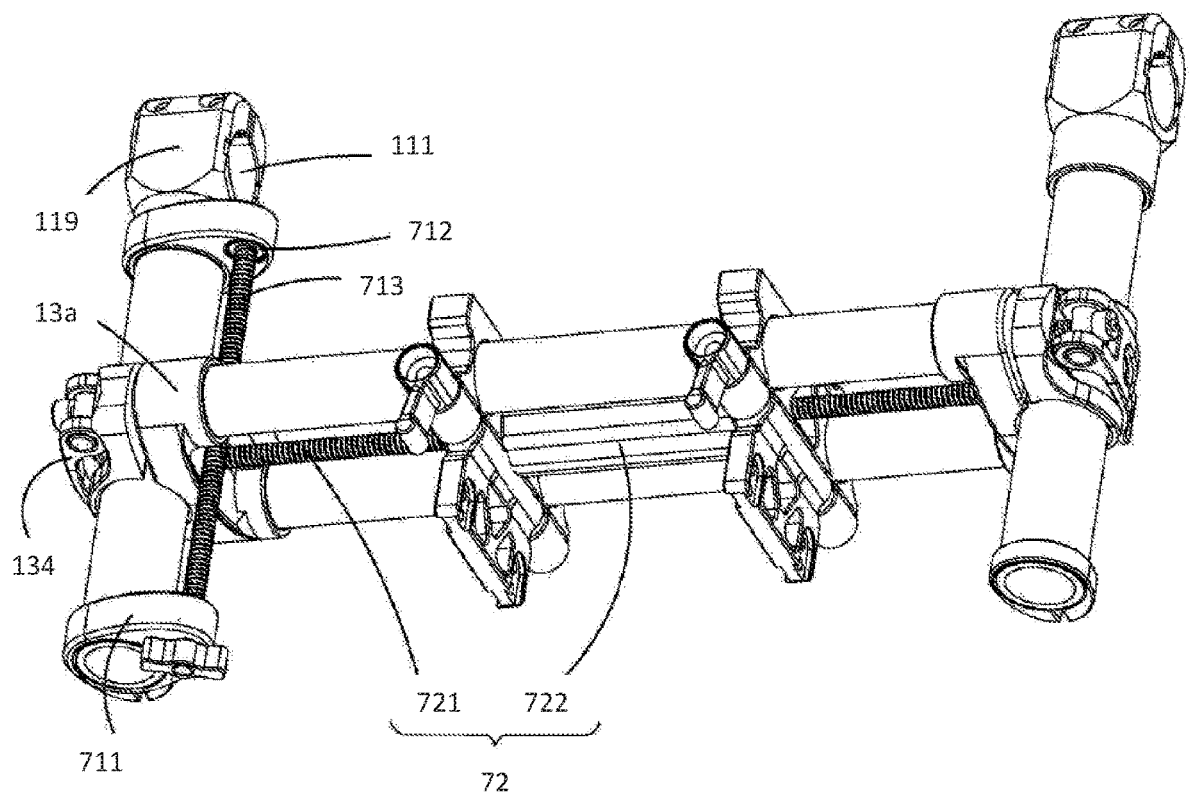
FIG. 1F schematically shows an exploded view of the first pivoted support, the payload support and the first center of gravity adjustment assembly in FIG. 1C.

In an embodiment as shown in FIG. 1D, FIG. 1E and FIG. 1F, the first center-of-gravity adjustment assembly 71 is provided on the first struts 11 for adjusting the position of the guide posts 12 on the first struts 11. The second center-of-gravity adjustment assembly 72 is disposed between the first seating devices 13 for adjusting the position of the first adapters 23 on the guide posts 12. The third center-of-gravity adjustment assembly 73 is provided in the connecting plate 45 for adjusting the position of the third strut 43 on the connecting plate 45.

In an embodiment, the first center-of-gravity adjustment assembly 71 includes two first clamps 711, two first bearings 712, and a first screw 713. The first clamps 711 are respectively provided at both ends of one of said first struts 11, wherein the first seating device 13 is located between the first clamps 711. The first clamps 711 are respectively provided with a first bearing hole 7110 for receiving the first bearings 712, respectively. One end of the first screw 713 passes through the first screw hole 136 housed in a first bearing 712 distal from the connecting end 119 and the loop 13a and fits in the first bearing 712 proximal to the connecting end 119. The first screw 713 may have a first rotary lever 7130 at one end distal from the connecting end 119.

In an embodiment, the first screw 713 may be directly engaged with the first clamps 711 without the first bearing 712.

In an embodiment, the second center-of-gravity adjusting assembly 72 includes a second screw rod 721 and a first rotary member 722 rotatably provided on the second screw rod 721.

The two ends of the second screw rod 721 are fixed to the two first seating devices 13, respectively. Both ends of the second screw rod 721 are fixed to the middle positions of the two first seating devices 13, respectively. Specifically, the two middle positions of the two loops 13a are respectively provided with a fixing hole 130a (as shown in FIG. 1J), and both ends of the second screw rod 721 are fixed in the fixing holes 130a, respectively.

The first rotary member 722 is provided between the two first adapters 23 and is fitted in the second screw rod 721. Specifically, the first rotary member 722 is abutted against the inner sidewall of the first adapters 23, and a screw hole (not shown) is provided at the central portion of the first rotary member 722. The screw hole of the first rotary member 722 is screwed to the second screw rod 721, and since the first rotary member 722 is abutted against the inner sidewall of the two first adapters 23. Therefore, the rotation of the first rotary member 722 on the second screw rod 721 can be transformed to the translation of the first adapter 23 on the second screw rod 721.

Figure 1G:
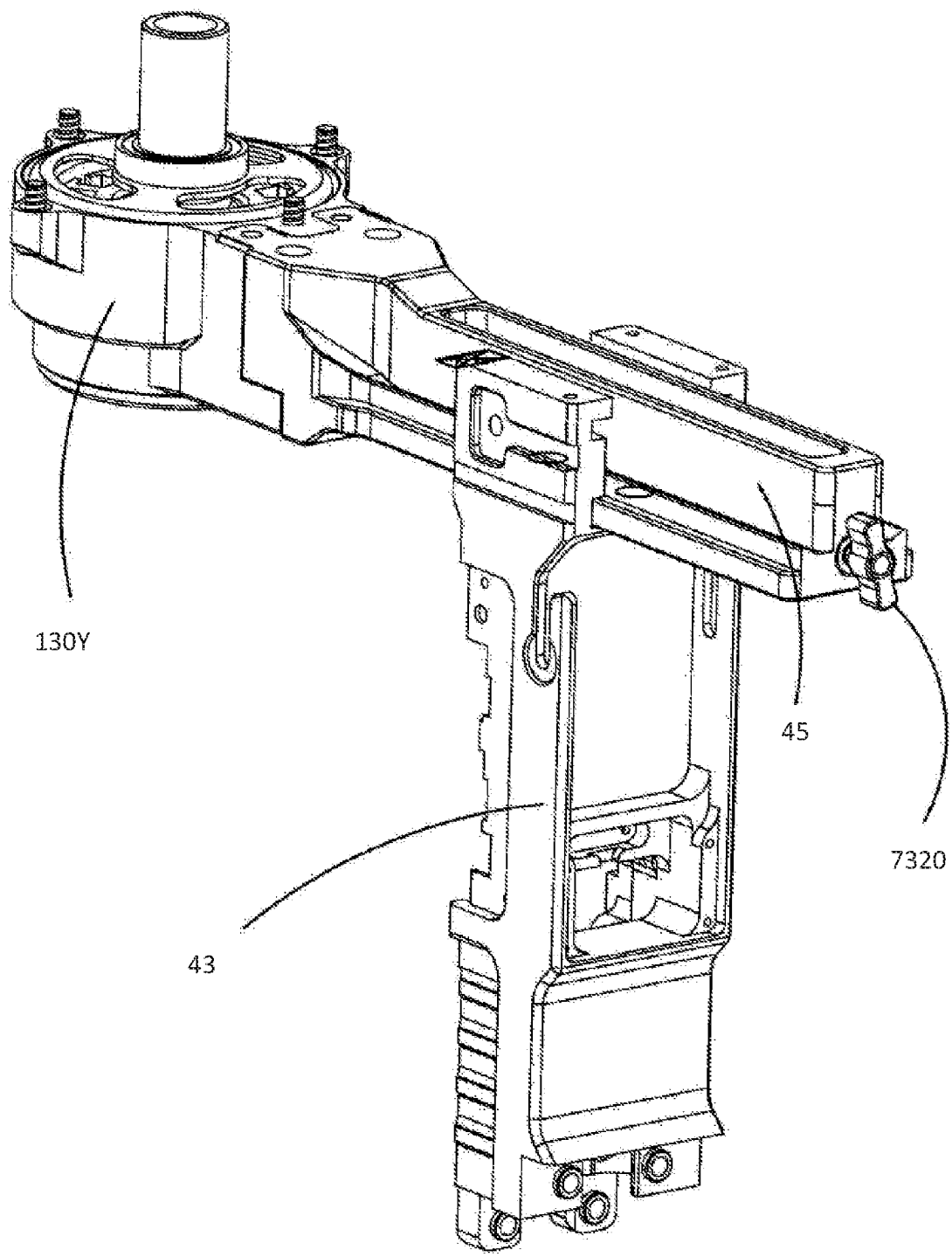
FIG. 1G schematically shows a perspective view of a third pivoted support and a third center-of-gravity adjustment assembly in FIG. 1B.
Figure 1H:
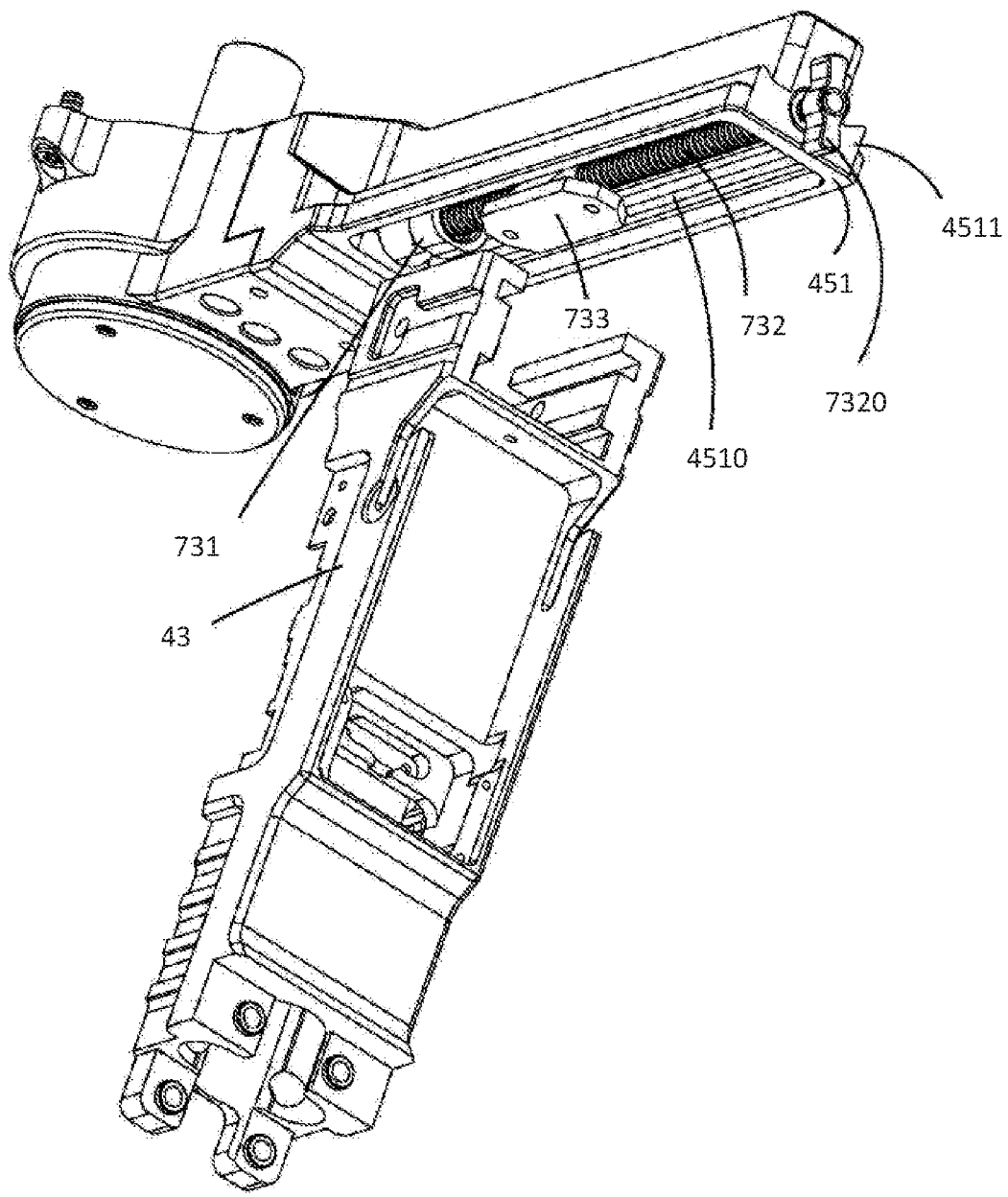
FIG. 1H schematically shows an exploded view of the third pivoted support and the third center of gravity adjustment assembly in FIG. 1G.
Figure 1I:
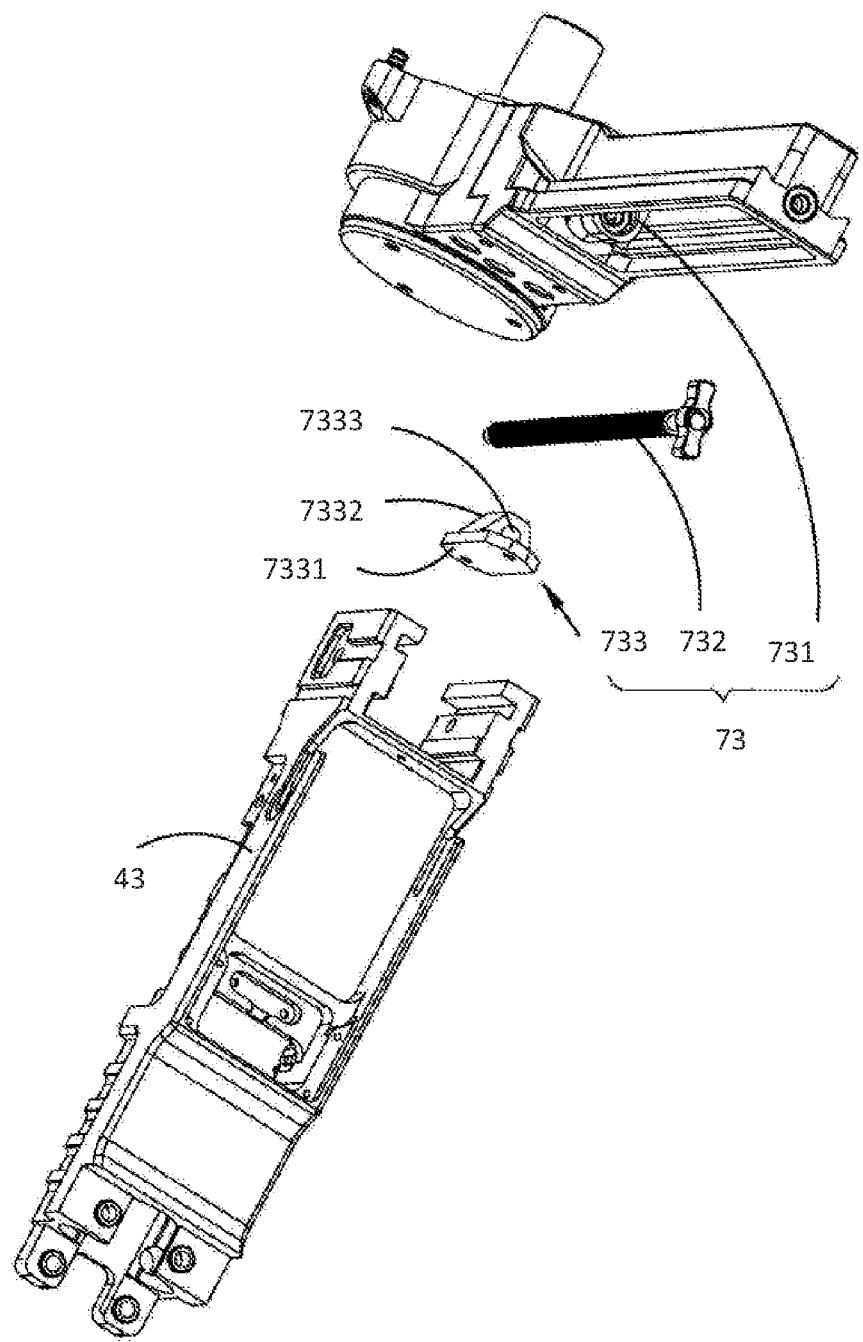
FIG. 1I schematically shows a perspective view of the third pivoted support and the third center of gravity adjustment assembly in FIG. 1H.
Figure 1J:
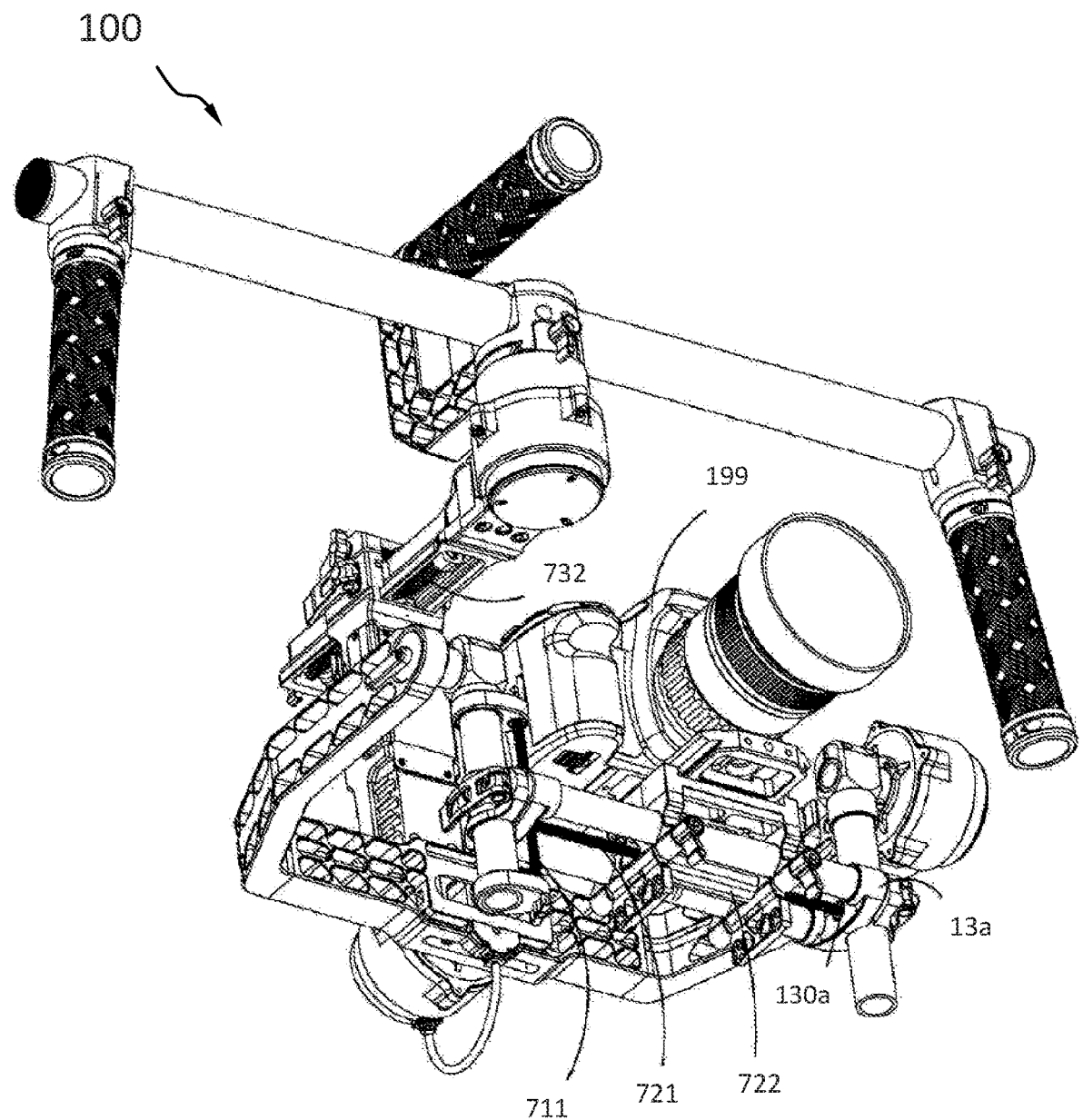
FIG. 1J schematically shows the apparatus of FIG. 1B in use.

In an embodiment, schematically shown in FIG. 1G, FIG. 1H and FIG. 1I, the third center of gravity adjustment assembly 73 comprises two second bearings 731 and a third screw 732, and a movable member 733 rotatably provided on the third screw 732.

In an embodiment, the connecting plate 45 of the third pivoted support 120Y includes a first bottom surface 451 in contact with the third strut 43. The first bottom surface 451 is provided with a receiving groove 4510. The receiving groove 4510 includes a first outer sidewall 4511. One of the second bearings 731 is fixed in the receiving groove 4510 and the other of the second bearings 731 is fixed to the first outer sidewall 4511. The axes of the second bearings 731 are substantially parallel and generally perpendicular to the longitudinal direction of the third strut 43. One end of the third screw 732 passes through a second bearing 731 distal from the first outer sidewall 4511 and fits in another second bearing 731 housed in the accommodating groove 4510. The third screw 732 may have a second rotary lever 7320 at one end of the first outer sidewall 4511.

In an embodiment, the movable member 733 includes a first moving portion 7331 and a second moving portion 7332 connected to the first moving portion 7331. The first moving portion 7331 is fixedly connected to the third strut 43. The first moving portion 7331 and the third strut 43 are fixed by bolts, or by welding. The second moving portion 7332 is provided with a second screw hole 7333. The third screw 732 passes through and engages with the second screw hole 7333.

In an embodiment, the third screw 732 is directly fitted on both sidewalls of the receiving groove 4510, without the second bearing 731.

In an embodiment schematically shown in FIG. 1J, the payload 199 is secured to the payload support 140 when in use. The center of gravity of the first pivoted support 120P, the payload support 140, and the payload 199 falls on the drive shaft of the motor 130P. The center of gravity of the payload support 140, the pivoted support 120P, the second pivoted support 120R, and the payload 199 falls on the drive shaft of the motor 130R. The center of gravity the payload support 140, the pivoted support 120P, the second pivoted support 120R, the payload 199, and the third pivoted support 120Y falls on the drive shaft of the motor 130Y.

If the center of gravity of the first pivoted support 120P, the payload support 140, and the payload 199 does not fall on the drive shaft of the motor 130P, the first center of gravity adjustment assembly 71 may be used to move the center of gravity of the first pivoted support 120P, the payload support 140, and the payload 199 to the drive shaft of the motor 130P. Specifically, the lock attachment 134 may be pulled to release the lock attachment 134 such that the locking hole 139 of the loop 13a is enlarged so that the loop 13a is loosely engaged with the first strut 11. The first screw 713 may be rotated in the first bearing 712 and the first screw hole 136, and the loop 13a may be rotated in the longitudinal direction of the first screw 713 so that the center of gravity of the first pivoted support 120P, the payload support 140, and the payload 199 falls on the drive shaft of the motor 130P.

In an embodiment, the first rotary lever 7130 may be replaced with a drive motor that rotates the first screw 713.

In an embodiment, the structure of the first center-of-gravity adjustment assembly 71 is not limited to those structures described above. The first center-of-gravity adjustment assembly 71 may be configured to adjust the position of the guide post 12 on the first strut 11 so that the center of gravity of the first pivoted support 120P, the payload support 140 and the payload 199 falls on the drive shaft of the motor 130P.

If the center of gravity of the payload support 140, the pivoted support 120P, the second pivoted support 120R, and the payload 199 does not fall on the drive shaft of the motor 130R, the second center-of-gravity adjustment assembly 72 may be used to move the center of gravity of the payload support 140, the pivoted support 120P, the second pivoted support 120R, and the payload 199 to the drive shaft of the motor 130R. Specifically, the first screw 233 may be released so that the aperture of the circular slot 230 is enlarged so that the first adapter 23 is loosely engaged with the guide post 12 and the first adapter 23 may be moved on the guide post 12 along the length of the guide post 12 so that the center of gravity of the payload support 140, the pivoted support 120P, the second pivoted support 120R, and the payload 199 falls on the drive shaft of the motor 130R.

In an embodiment, the structure of the second center-of-gravity adjustment assembly 72 is not limited to those structures described above. The second center-of-gravity adjustment assembly 72 may be configured to adjust the position of the first adapter 23 on the guide post 12 be adjusted so that the center of gravity of the payload support 140, the pivoted support 120P, the second pivoted support 120R, and the payload 199 falls on the drive shaft of the motor 130R.

If the center of gravity of the payload support 140, the pivoted support 120P, the second pivoted support 120R, the payload 199, and the third pivoted support 120Y does not fall on the drive shaft of the motor 130Y, the third center of gravity adjustment assembly 73 may be used to move the center of gravity of the payload support 140, the pivoted support 120P, the second pivoted support 120R, the payload 199, and the third pivoted support 120Y to the drive shaft of the motor 130Y. Specifically, the second rotary lever 7320 may be rotated, the third screw 732 may be rotated within the second screw hole 7333 of the second bearing 731 and the movable member 733, and the third strut 43 may be moved in the longitudinal direction so that the center of gravity of the payload support 140, the pivoted support 120P, the second pivoted support 120R, the payload 199, and the third pivoted support 120Y falls on the drive shaft of the motor 130Y.

In an embodiment, the second rotary lever 7320 may be replaced with a drive motor that rotates the third screw 732.

In an embodiment, the structure of the third center-of-gravity adjustment assembly 73 is not limited to those structures described above. The third center-of-gravity adjustment assembly 73 may be configured to adjust the position of the third strut 43 on the connecting plate 45 so that the center of gravity of the payload support 140, the pivoted support 120P, the second pivoted support 120R, the payload 199, and the third pivoted support 120Y falls on the drive shaft of the motor 130Y.

One, two or all three of the three center-of-gravity adjustment assemblies may be included in the apparatus 100.

Figure 2A:
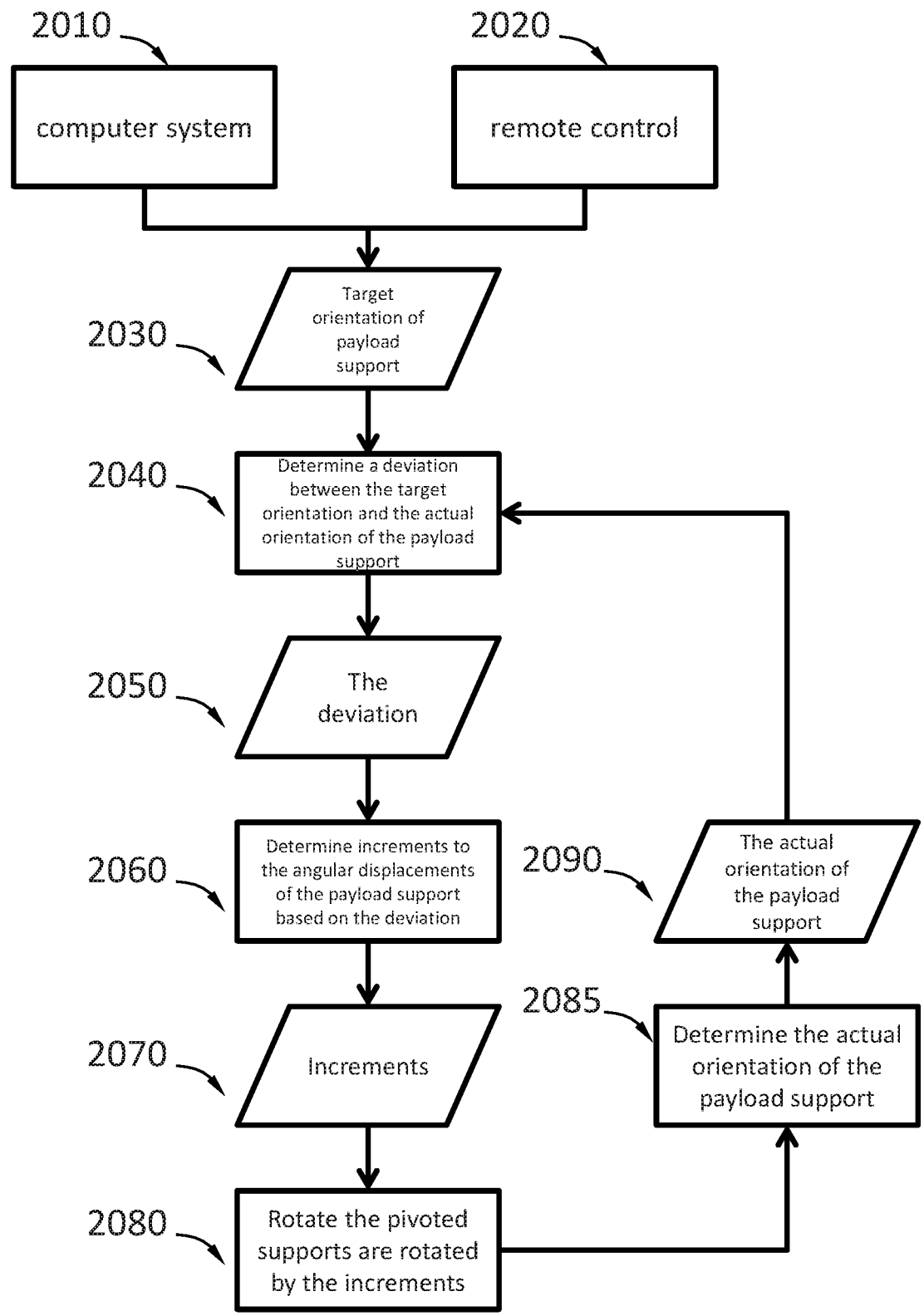
FIG. 2A schematically shows a flowchart for a method of stabilizing the orientation of a payload support (and thereby stabilizing the payload mounted to the payload support).

FIG. 2A schematically shows a flowchart for a method of stabilizing the orientation of the payload support 140 (and thereby stabilizing the payload 199 mounted to the payload support 140), by constantly measuring and reducing the deviation between the target orientation and the actual orientation of the payload support 140. In this disclosure, stabilizing the payload 199 and stabilizing the payload support 140 are used interchangeably because the payload 199 is fixed to and thus has no relative motion with respect to the payload support 140. In this flowchart, the stabilization of the payload support 140 is under the assumption that the target orientation 2030 of the payload support 140 is near the actual orientation 2090 of the payload support 140; namely, the target orientation 2030 changes slowly with respect to the execution of this method. The target orientation 2030 of the payload 199 may be obtained in any suitable way. In an example, the target orientation 2030 may be obtained by signals from a remote control 2020. A remote control 2020 may be a device with joysticks a person may use to adjust the target orientation 2030. A remote control 2020 may be a device (e.g., a phone) that can measure its own orientation and transmit this orientation or a function thereof as the target orientation 2030 of the payload support 140. In another example, the target orientation 2030 may be obtained from a computer system 2010 that determines the target orientation 2030 from one or more images acquired by the payload 199. The computer system 2010 may analyze the images, identify an object therein and find an orientation as the target orientation 2030, at which the payload 199 gazes at the object. In procedure 2040, a deviation 2050 between the target orientation 2030 and the actual orientation 2090 of the payload support 140 is determined. The deviation 2050 is small because the target orientation 2030 changes slowly with respect to the execution of this method. In procedure 2060, increments 2070 to the angular displacements of the payload support 140 about the gimbal axes of the pivoted supports 120 are determined based on the deviation 2050. In procedure 2080, the pivoted supports 120 are rotated by the increments 2070, thereby causing the payload support 140 to be at the target orientation 2030. In procedure 2085, the actual orientation 2090 of the payload support 140 is determined, for example, using sensors at the pivoted supports 120.

Figure 2B:
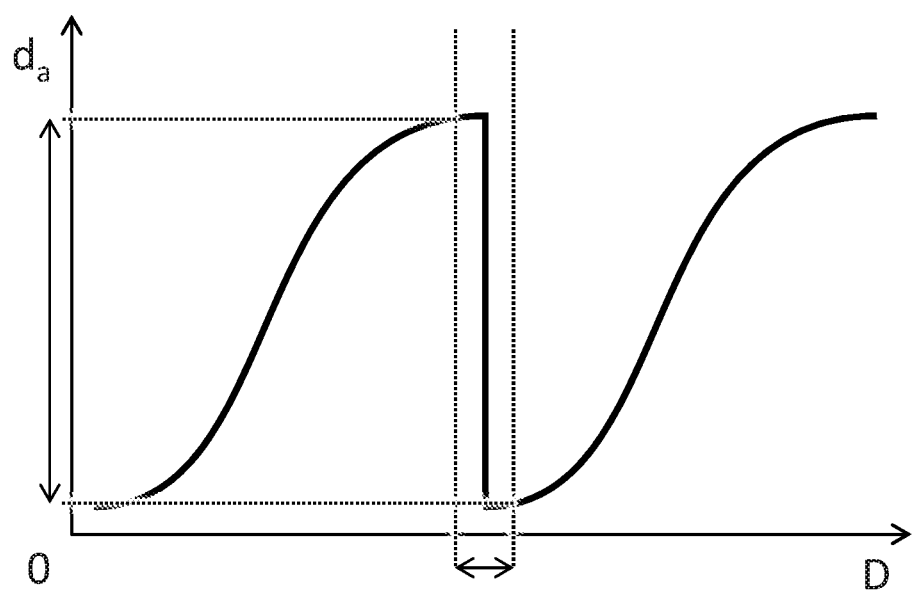
FIG. 2B schematically shows that a small range of a deviation (shown along the "D" axis) around 0 rad or $2\pi$ rad of the angular displacements (shown along the "da" axis) may correspond to a large range of the angular displacements.

The method of FIG. 2A may not be able to handle the situation where the increments 2070 are not continuous functions of the deviation 2050. For example, as schematically shown in FIG. 2B, if the apparatus 100 does not distinguish angular displacements about a gimbal axis that differ by one or more full turns, e.g., the angular displacements about the gimbal axis can only be within a numerical interval of [0 rad, $2\pi$ rad), a small range of the deviation 2050 (shown along the "D" axis in FIG. 2B) around 0 rad or $2\pi$ rad of the angular displacements (shown along the "$d_a$" axis in FIG. 2B) may correspond to a large (e.g., almost of the magnitude of $2\pi$ rad) range of the angular displacements.

This situation where the increments 2070 are not continuous functions of the deviation 2050 may occur when the apparatus 100 switch between or is turned on in multiple distinct orientations.

Figure 3:
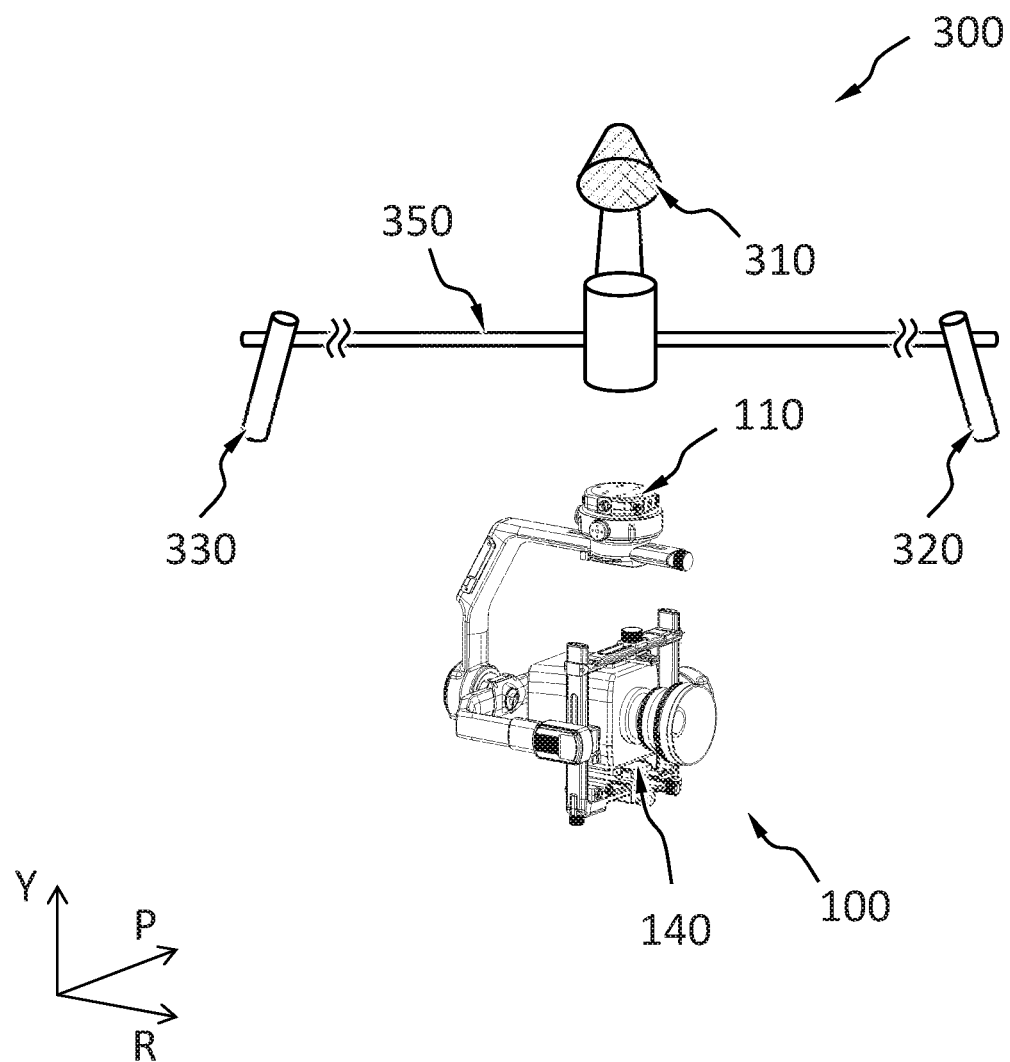
FIG. 3 schematically shows that the apparatus may be mounted to a handle assembly in a configuration.

FIG. 3 schematically shows that the apparatus 100 may be mounted to a handle assembly 300, where the base 110 is positioned above the payload support 140 in the absolute frame of reference. In this example, the handle assembly 300 has a first handle 310 configured to be held by a person's hand. The handle assembly 300 may have a bar 350, a second handle 320 and a third handle 330. The first handle 310, second handle 320 and third handle 330 may be attached to the bar 350. The first handle 310 may be positioned between the second handle 320 and the third handle 330 along the direction of the bar 350. The center of gravity of the apparatus 100 and the first handle 310 may be on different sides of the bar 350.

A person may hold any of the handles 310, 320 and 330, or the bar 350. The person may change to the orientation of the handle assembly 300. The apparatus 100 may stabilize the payload support 140 while the person changes the orientation of the handle assembly 300. The pivoted supports 120 may rotate (e.g., by the action of the motors 130) relative to one another, relative to the base 110 or relative to the handle assembly 300 in order to keep the payload support 140 stabilized.

The pivoted supports 120 of the apparatus 100 and the handle assembly 300 may be positioned in a variety of configurations, although these configurations are not qualitatively different. The configuration shown in FIG. 3 may be called the "underslung mode." In the underslung mode, the payload support 140 is located between the handles 320 and 330; the payload support 140 is below the bar 350 in the absolute frame of reference. In the underslung mode, a person may hold the handle assembly 300 with two hands on the handles 320 and 330, or hold the handle assembly 300 with on hand on the first handle 310. In the underslung mode, the bar 350 is generally horizontal in the absolute frame of reference. In the underslung mode, the center of gravity of the apparatus 100 and the payload 199 may be below the bar 350 or the handles 310, 320 and 330.

Figure 4:
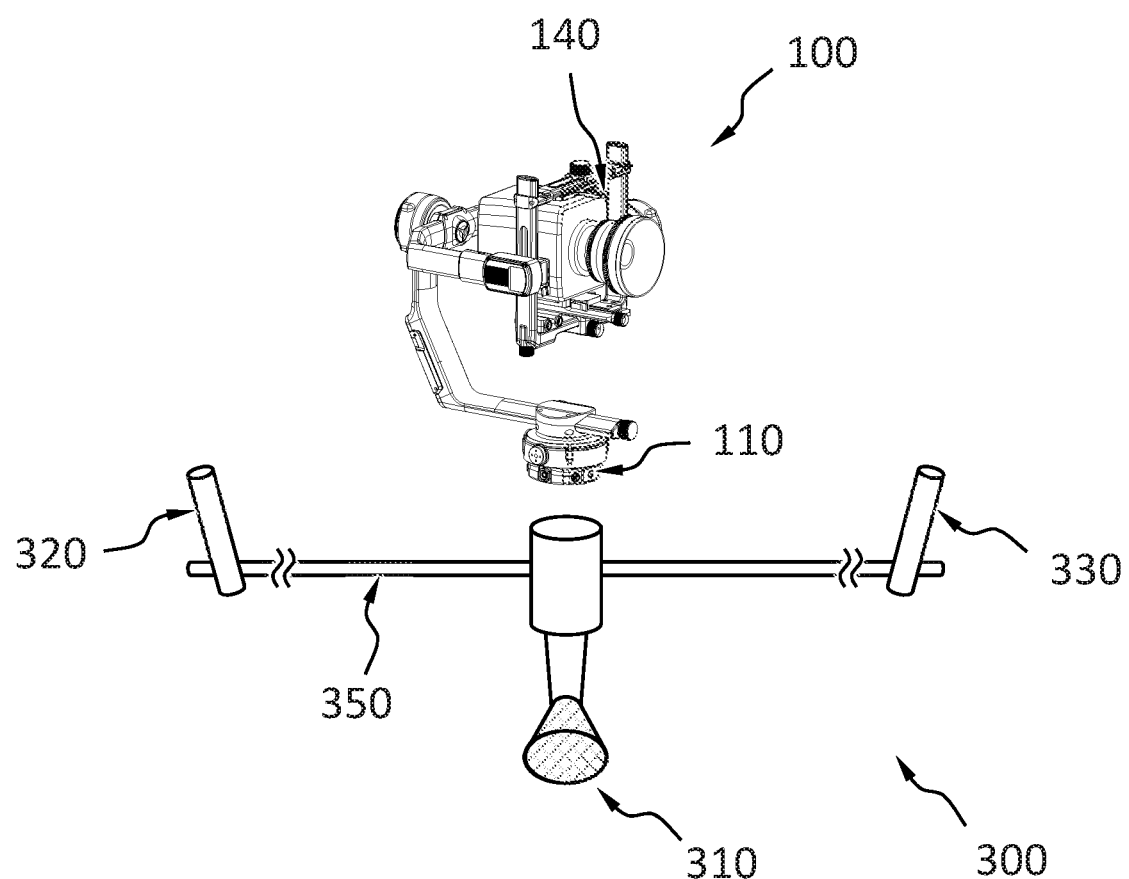
FIG. 4 schematically shows that the apparatus may be mounted to the handle assembly in another configuration.
Figure 4:
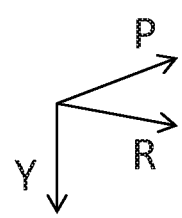
Figure 5:
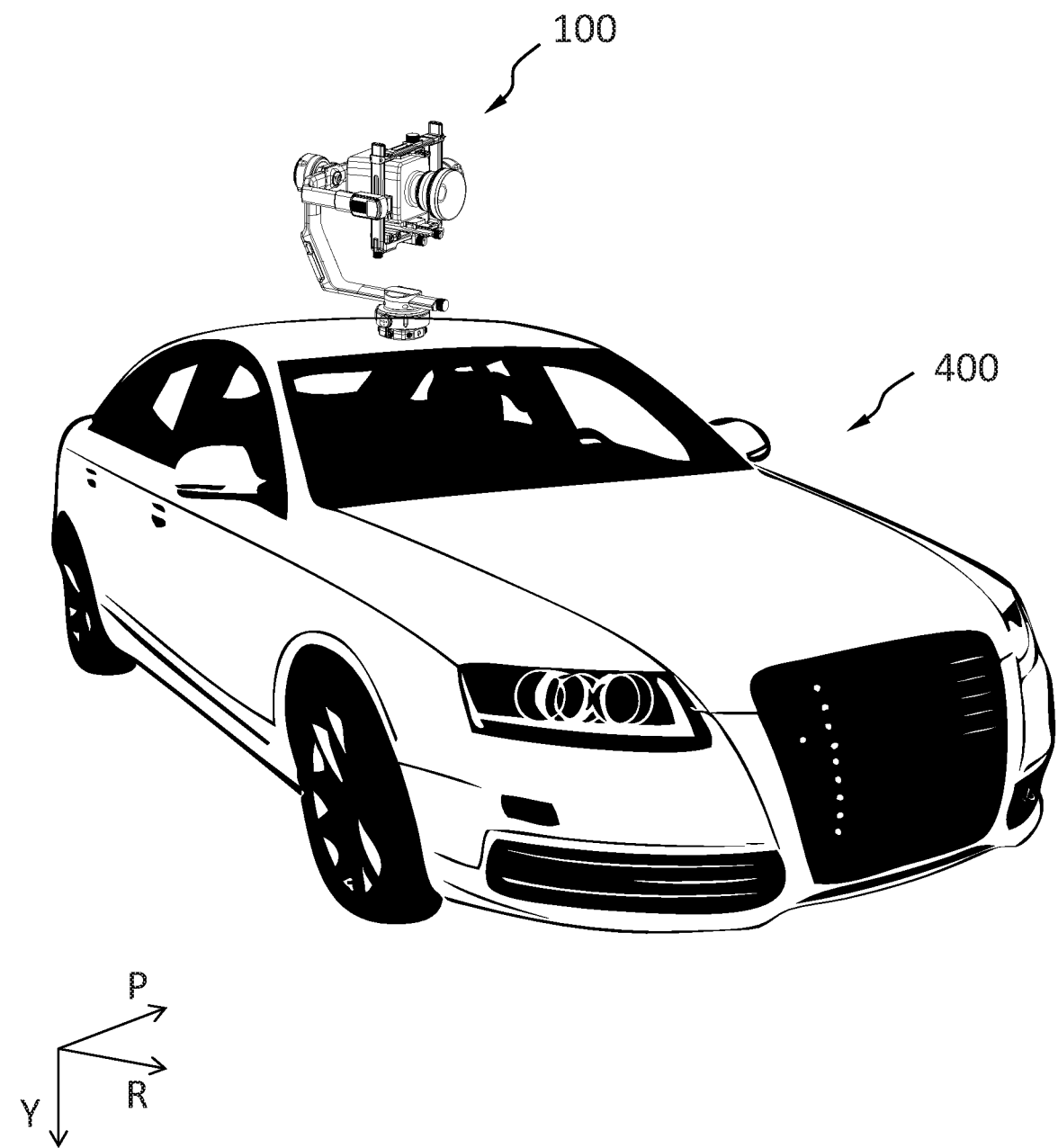
FIG. 5 schematically shows that the apparatus may be mounted to a vehicle.

FIG. 4 schematically shows that the apparatus 100 may be mounted to the handle assembly 300, where the base 110 is positioned below the payload support 140 in the absolute frame of reference. This configuration shown in FIG. 4 may be referred to as the "upright mode." In the upright mode, the pivoted support 120Y (and its gimbal axis Y) and the base 110 are rotated by about half a turn (about $\pi$ rad) about the gimbal axis R, with respect to the configuration of FIG. 3. In the upright mode, the payload support 140 is above the handles 310, 320, 330 or above the bar 350. In the upright mode, a person may hold the handle assembly 300 with two hands on the handles 320 and 330. In the upright mode, the bar 350 is generally horizontal in the absolute frame of reference. In the upright mode, the center of gravity of the apparatus 100 and the payload 199 may be above the bar 350 or the handles 310, 320 and 330. FIG. 5 schematically shows that the apparatus 100 may be mounted to a vehicle 400. Although a land vehicle (e.g., a car) is shown in FIG. 5, the apparatus 100 may be mounted to other vehicles such as an aerial vehicle (manned or unmanned) or a watercraft. The apparatus 100 is shown to be mounted to the roof of the vehicle 400 but the apparatus 100 may be mounted to other locations such as the side.

The base 110 of the apparatus 100 may experience large orientation changes during use or between uses. For example, the reference orientation of the base 110 and the actual orientation of the base 110 at a later time than the reference orientation may differ by more than 45 degrees, more than 90 degrees, or more than 135 degrees, about an axis during use or between uses (e.g., when the apparatus 100 switches between different modes). The large orientation changes of the base 110 may create the situation where the increments 2070 to the angular displacements of the pivoted supports 120 are not continuous functions of the deviation 2050, and thus render stabilization using the deviations 2050 between the target orientation and the actual orientation of the payload support 140 insufficient. For example, to cause the payload support 140 to yaw to the same direction in the absolute frame of reference, the angular displacements of the pivoted support 120Y would be in opposite directions in the configurations shown in FIG. 3 and FIG. 4. In other another configuration, e.g., when the axis Y is horizontal, the axis R is vertical and the axis P is horizontal, to cause the payload support 140 to yaw would be by angular displacements of the pivoted support 120R instead of the pivoted support 120Y.

FIG. 1A, FIG. 6, FIG. 7 and FIG. 8 each show an example of a combination of orientations of the base 110 and the payload support 140. The combination of FIG. 1A will be used as a reference to explain the combinations of FIG. 6, FIG. 7 and FIG. 8. As shown in FIG. 1A, the gimbal axis Y of the pivoted support 120Y is defined as pointing from the payload 199 to the motor 130Y; the gimbal axis P of the pivoted support 120P is defined as pointing from the payload 199 to the motor 130P; the gimbal axis R of the pivoted support 120R is defined as pointing from the motor 130R to the payload 199. A rotation is represented by a vector along the axis of the rotation. The direction of the vector is defined under the right-hand rule: right fingers curled in the direction of rotation and the right thumb pointing along the direction of the vector. A rotation whose vector points along the direction of a gimbal axis is defined as a positive rotation about that gimbal axis and a rotation whose vector points opposite to the direction of the gimbal axis is defined as a negative rotation about that gimbal axis. Therefore, under these definitions and in the combination of FIG. 1A, a positive rotation about the gimbal axis Y causes a camera (as an example of the payload 199) to yaw to the left relative to the absolute frame of reference (viewing from the back of the camera toward a scene the camera points to); a positive rotation about the gimbal axis R causes the camera to roll to the right relative to the absolute frame of reference (viewing from the back of the camera toward a scene the camera points to); a positive rotation about the gimbal axis P causes the camera to pitch downward relative to the absolute frame of reference.

Figure 6:
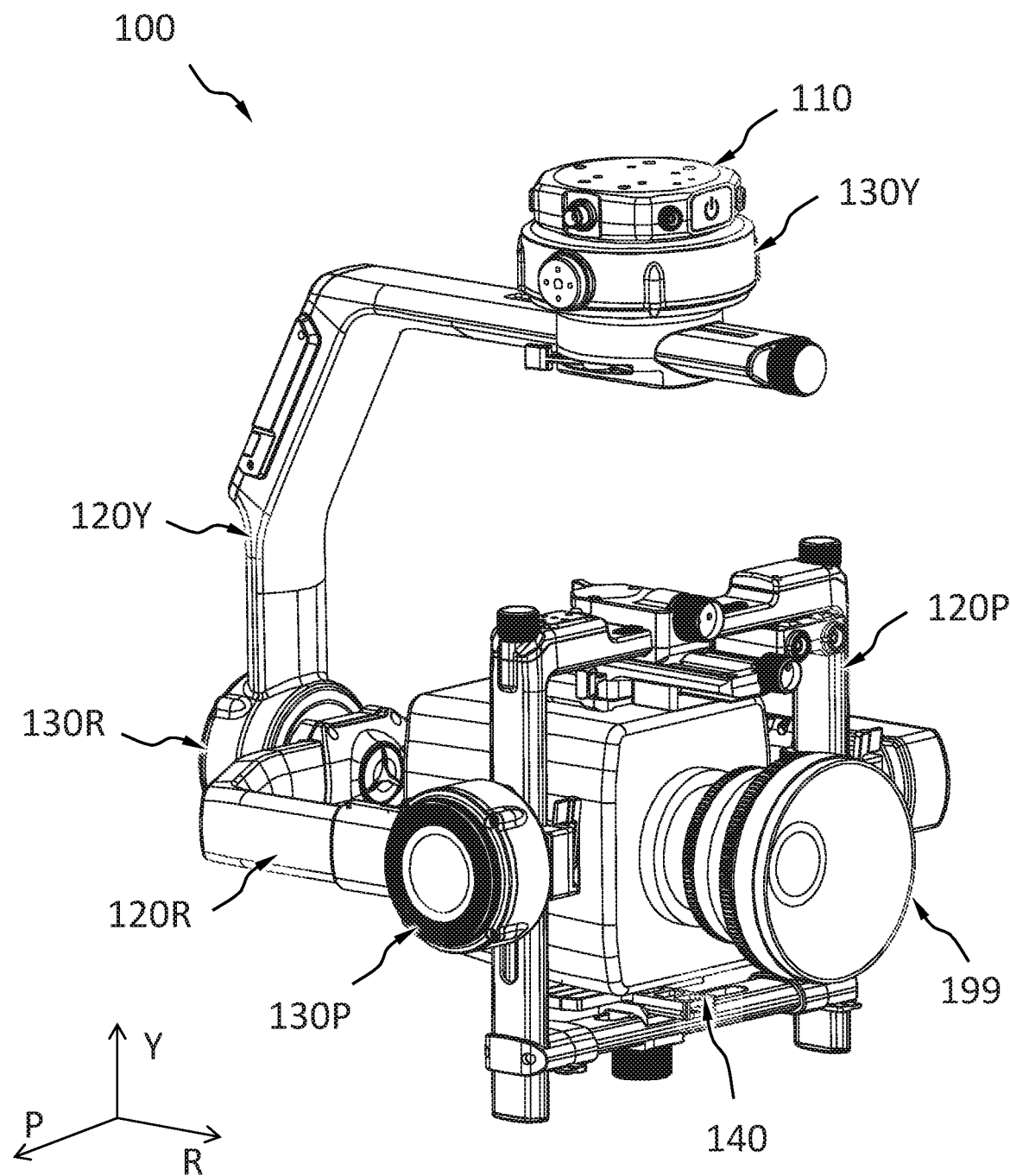
FIG. 6, FIG. 7 and FIG. 8 each show an example of a combination of orientations of the base and the payload support of the apparatus.

In the combination of orientations of FIG. 6, the pivoted support 120R, the pivoted support 120P (also its gimbal axis P), the payload support 140 and the payload 199 have been rotated by about π rad about the gimbal axis R, relative to the combination of FIG. 1A. Therefore, in the combination of FIG. 6, a positive rotation about the gimbal axis Y causes a camera (as an example of the payload 199) to yaw to the left relative to the absolute frame of reference (viewing from the back of the camera toward a scene the camera points to); a positive rotation about the gimbal axis R causes the camera to roll to the right relative to the absolute frame of reference (viewing from the back of the camera toward a scene the camera points to); a positive rotation about the gimbal axis P causes the camera to pitch upward relative to the absolute frame of reference. Namely, in order to pitch the camera downward relative to the absolute frame of reference, the rotations about the gimbal axis P in the combination of FIG. 1A and the combination of FIG. 6 are in opposite directions.

Figure 7:
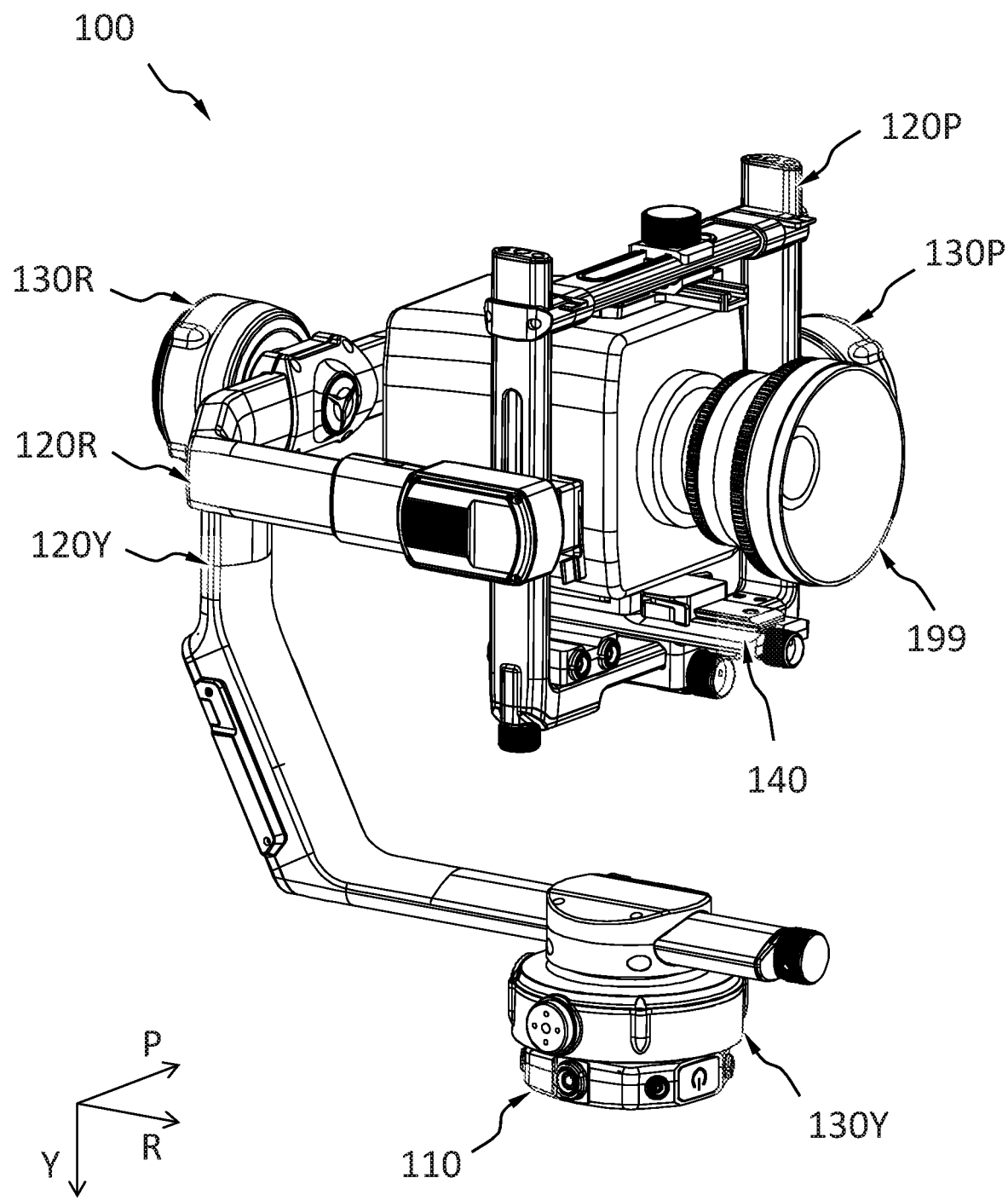

In the combination of orientations of FIG. 7, the base and the pivoted support 120Y (also its gimbal axis Y) have been rotated by about π rad about the gimbal axis R, relative to the combination of FIG. 1A. Therefore, in the combination of FIG. 7, a positive rotation about the gimbal axis Y causes a camera (as an example of the payload 199) to yaw to the right relative to the absolute frame of reference (viewing from the back of the camera toward a scene the camera points to); a positive rotation about the gimbal axis R causes the camera to roll to the right relative to the absolute frame of reference (viewing from the back of the camera toward a scene the camera points to); a positive rotation about the gimbal axis P causes the camera to pitch downward relative to the absolute frame of reference. Namely, in order to yaw the camera to the left relative to the absolute frame of reference, the rotations about the gimbal axis Y in the combination of FIG. 1A and the combination of FIG. 7 are in opposite directions.

Figure 8:
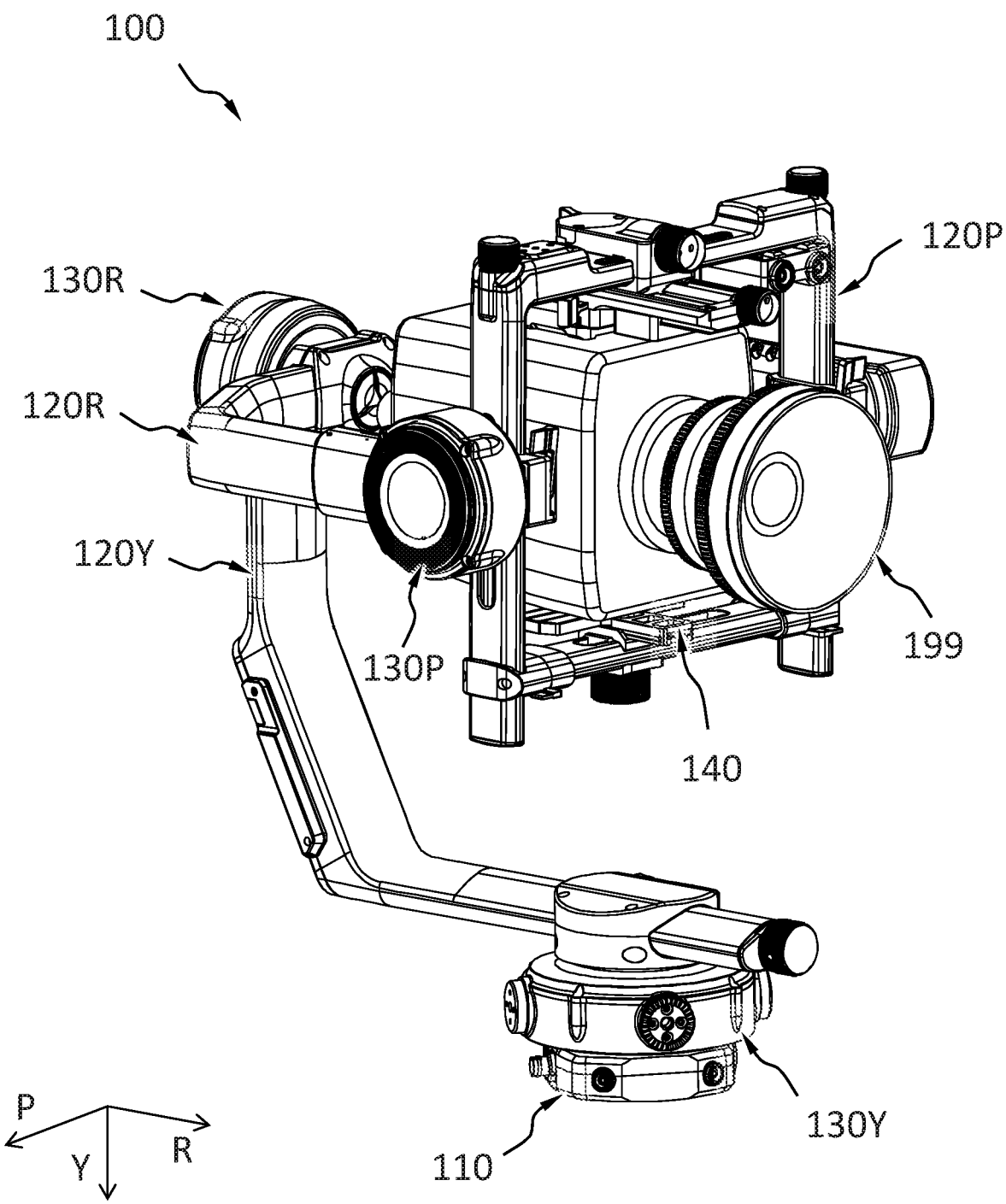

In the combination of orientations of FIG. 8, the base 110, the pivoted support 120Y (also its gimbal axis Y), the pivoted support 120R, the pivoted support 120P (also its gimbal axis P), and the payload support 140 have been rotated by about π rad about the gimbal axis R, relative to the combination of FIG. 1A. Therefore, in the combination of FIG. 8, a positive rotation about the gimbal axis Y causes a camera (as an example of the payload 199) to yaw to the right relative to the absolute frame of reference (viewing from the back of the camera toward a scene the camera points to); a positive rotation about the gimbal axis R causes the camera to roll to the right relative to the absolute frame of reference (viewing from the back of the camera toward a scene the camera points to); a positive rotation about the gimbal axis P causes the camera to pitch upward relative to the absolute frame of reference. Namely, in order to yaw the camera to the left relative to the absolute frame of reference, the rotations about the gimbal axis Y in the combination of FIG. 1A and the combination of FIG. 8 are in opposite directions; in order to pitch the camera downward relative to the absolute frame of reference, the rotations about the gimbal axis P in the combination of FIG. 1A and the combination of FIG. 8 are in opposite directions.

There are many other possible combinations of orientations of the base 110 and the payload support 140. If the deviations 2050 between the target orientation and the actual orientation of the payload support 140 are the only parameter relied on for the stabilization, the stabilization may be limited to a relative small range around the initial (i.e., when the apparatus 100 is powered) orientations of the base 110 and the payload support 140 without knowing the relationship between the deviations 2050 and the angular displacements of the pivoted supports in each combination of orientations of the base 110 and the payload support 140.

Figure 9:
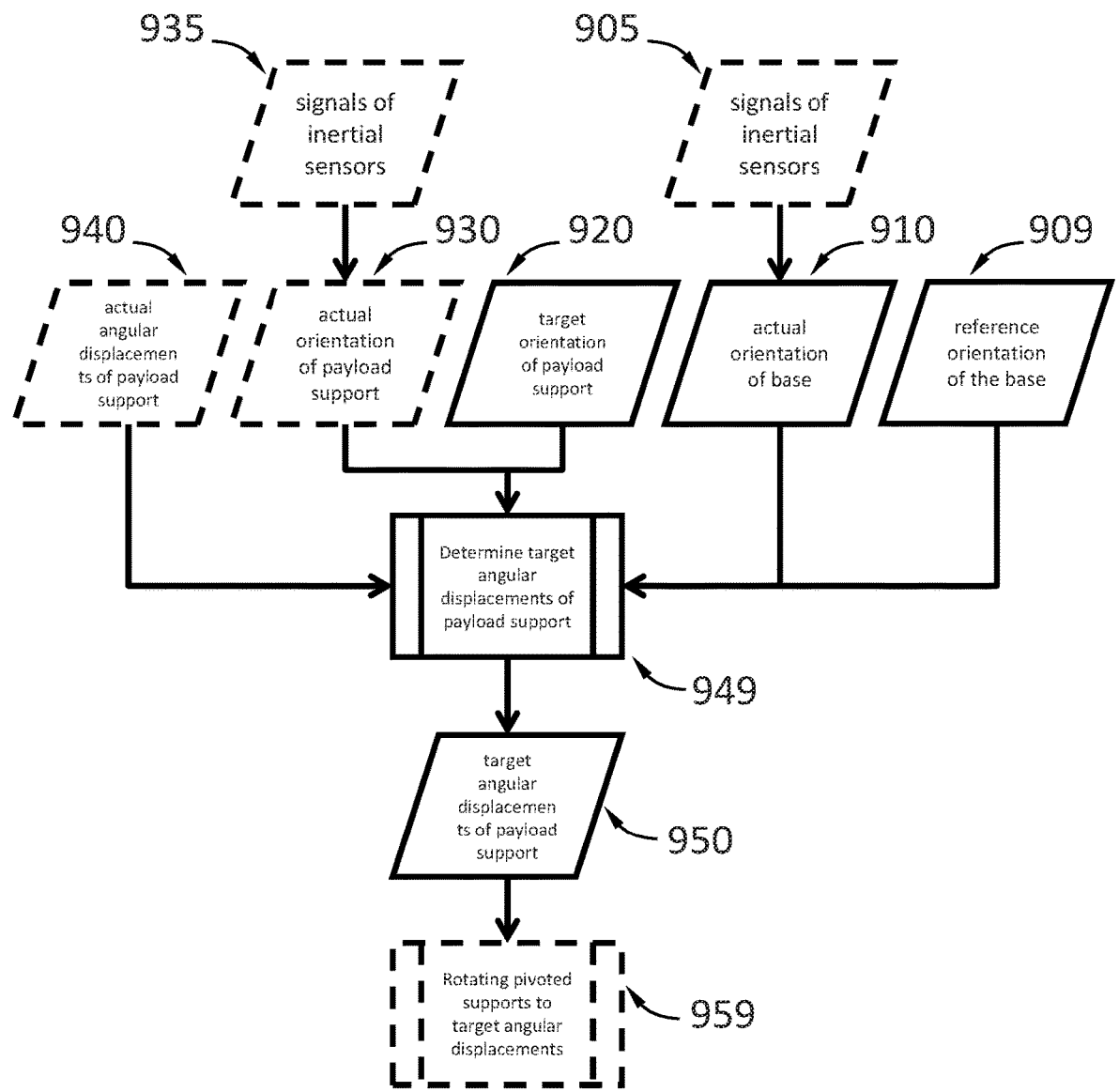
FIG. 9 schematically shows a flowchart for a method of stabilizing the payload support, according to an embodiment.

FIG. 9 schematically shows a flowchart for a method of stabilizing the payload support 140, according to an embodiment. This method allows large variations of the actual orientation of the base 110 and the target orientation of the payload support 140 during use or between powering of the apparatus 100. This method allows powering on the apparatus 100 at any combination of actual orientations of the base 110 and the payload support 140. In this method, an actual orientation 910 of the base 110 and the target orientation 920 of the payload support 140 are obtained. The actual orientation 910 of the base may be relative to a reference orientation 909 of the base. The reference orientation 909 may be an actual orientation of the base 110 at another point of time. The reference orientation 909 may be obtained at a time earlier than determining the actual orientation 910 of the base 110. For example, the reference orientation 909 may be determined upon powering the apparatus 100. As defined above, the term "orientation" of an object is with respect to the absolute frame of reference. The reference orientation 909 or the actual orientation 910 of the base 110 may be determined using signals 905 of the inertial sensors that are mounted to the apparatus 100 (e.g., mounted to the base 110). The target orientation 920 of the payload support 140 may be obtained in any suitable way. In an example, the target orientation 920 may be obtained by signals from a remote control (e.g., a device with joysticks a person may use to adjust the target orientation 920, or a device such as a phone that can measure its own orientation and transmit this orientation or a function thereof as the target orientation 920 of the payload support 140). In another example, the target orientation 920 may be obtained from a computer system that determines the target orientation 920 from one or more images obtained by the payload 199. The computer system may analyze the images, identify an object therein and find an orientation, as the target orientation 920, at which the payload 199 gazes at the object.

Optionally, the actual orientation 930 of the payload support 140 or the actual angular displacements 940 of the payload support 140 about the gimbal axes of the pivoted supports 120 is determined. In an example, the actual orientation 930 of the payload support 140 is determined using signals 935 of the inertial sensors that are mounted to the apparatus 100 (e.g., mounted to the payload support 140). In an example, the actual angular displacements 940 of the payload support 140 about the gimbal axes of the pivoted supports 120 are determined using sensors (e.g., Hall effect sensors) configured to detect the rotation of the pivoted supports 120 (e.g., sensors mounted to the motors 130). The reference orientation 909 and the actual orientation 910 of the base 110, the target orientation 920 of the payload support 140, optionally the actual orientation 930 of the payload support 140, and optionally the actual angular displacements 940 of the payload support 140 may be available to the apparatus 100 at all times while the apparatus 100 is powered. In procedure 949, the target angular displacements 950 of the payload support 140 about the gimbal axes of the pivoted supports 120 are determined based on the actual orientation 910 of the base 110, the target orientation 920 of the payload support 140, optionally the actual orientation 930 of the payload support 140, optionally the reference orientation 909 of the base 110, and optionally the actual angular displacements 940 of the payload support 140. In optional procedure 959, the pivoted supports 120 are rotated (e.g., by the motors 130) to the target angular displacements 950, thereby causing the payload support 140 to have the target orientation 920. Determining the target angular displacements 950 of the payload support 140 in procedure 949 may include transforming the target orientation 920 of the payload support 140 by a non-identity function, transforming the actual orientation 930 of the payload support 140 by a non-identity function, transforming the actual orientation 910 of the base 110 by a non-identity function, transforming the target angular displacements 950 of the payload support 140 by a non-identity function, transforming the actual angular displacements 940 of the payload support 140 by a non-identity function. The term "non-identity function" is a function that is not the identity function. The identity function is a function that always returns the same value that was used as its argument. The identity function is given by $f(x)=x$. The non-identity function may be a linear function. For example, transforming these orientations or angular displacements may include offsetting or multiplying these orientations or angular displacements by a factor. The form of the non-identity function (e.g., the amount of the offsetting or the value of the factor) may depend on the reference orientation 909 of the base 110. The form of the non-identity function may be changed to accommodate large orientation changes of the base 110. By changing the form of the non-identity function, the dependency of the target angular displacements 950 of the payload support 140 on the actual orientation 910 of the base 110, the target orientation 920 of the payload support 140, optionally the actual orientation 930 of the payload support 140, and optionally the actual angular displacements 940 of the payload support 140 may be changed. For example, in order to have the same target orientation 920 of the payload support 140 in the combinations of orientations of the base 110 and the payload support 140 in FIG. 1A and FIG. 7, the actual angular displacements 940 of the payload support 140 should differ by π rad about the gimbal axis Y and have opposite signs (i.e., multiplied by a factor of −1).

Figure 10A:
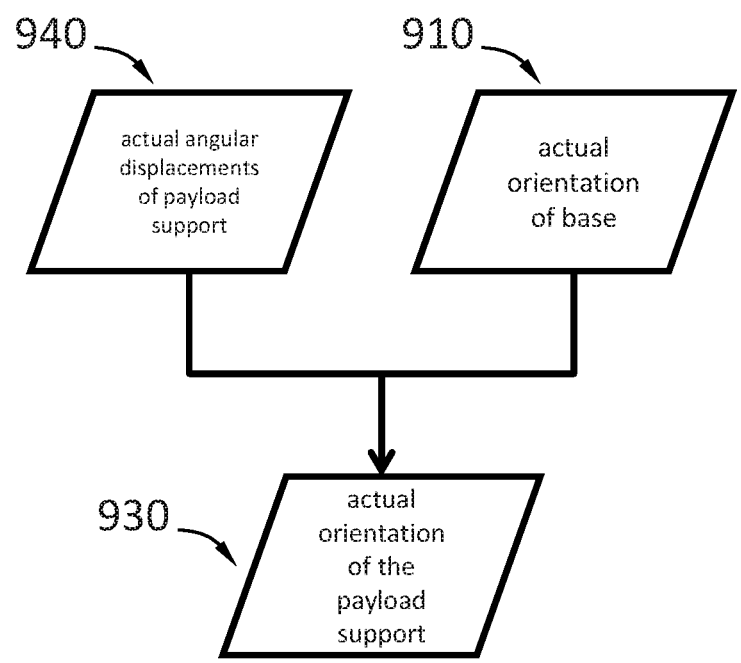
FIG. 10A schematically shows that the actual orientation of the payload support may be determined based on the actual orientation of the base and the actual angular displacements of the payload support.

FIG. 10A schematically shows that the actual orientation 930 of the payload support 140 may be determined based on the actual orientation 910 of the base 110 and the actual angular displacements 940 of the payload support 140.

Figure 10B:
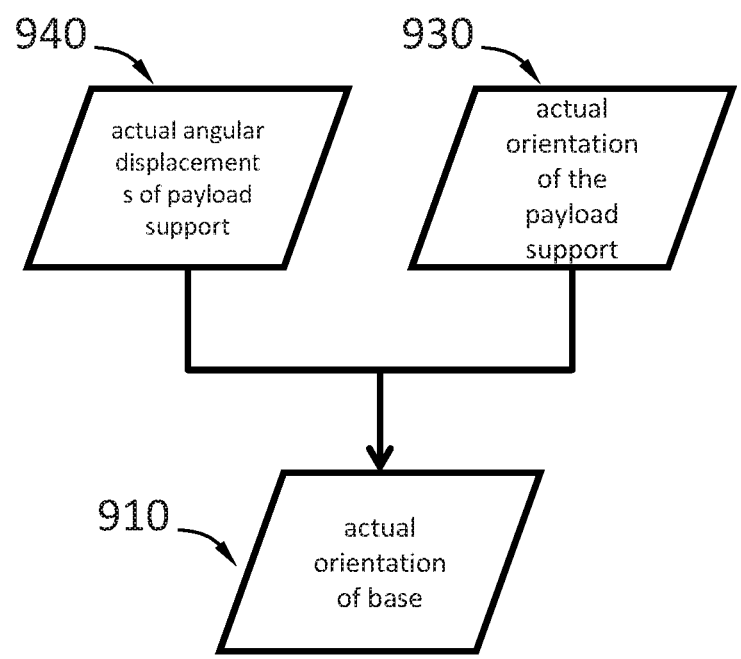
FIG. 10B schematically shows that the actual orientation of the base may be determined based on the actual orientation of the payload support and the actual angular displacements of the payload support.

FIG. 10B schematically shows that the actual orientation 910 of the base 110 may be determined based on the actual orientation 930 of the payload support 140 and the actual angular displacements 940 of the payload support 140.

The procedure 949 may include finding values of the Tait-Bryan angles (i.e., the target angular displacements) about the gimbal axes, at which values the pivoted supports 120 cause the payload support 140 to be at the target orientation 920 while mounted to the base 110 at the actual orientation 910, through the pivoted supports 120. In a mathematical form, the procedure 949 solves for the Tait-Bryan angles (i.e., the target angular displacements) $AD_Y$, $AD_R$ and $AD_P$ about the gimbal axes Y, R and P, respectively, where their corresponding rotation matrix $M(AD_Y, AD_R, AD_P)=M_Y M_R M_P$ links the target orientation 920 as represented by its direction vector $n_p$ and the actual orientation 910 as represented by its direction vector $n_b$ as follows:

$$n_p = M n_b \qquad \text{(Eq. 1)}.$$

$M_Y$, $M_R$, $M_P$ are rotation matrices corresponding to the Tait-Bryan angles $AD_Y$, $AD_R$ and $AD_P$ about the gimbal axes Y, R and P, respectively. Before executing the procedure 949, the target orientation 920 and the actual orientation 910 are already determined. Therefore, the Tait-Bryan angles (i.e., the target angular displacements) $AD_Y$, $AD_R$ and $AD_P$ about the gimbal axes Y, R and P, respectively, may be determined by solving Eq. 1. The solution to Eq. 1 for a given target orientation 920 of the payload support 140 and a given actual orientation 910 of the base 110 may not be unique. The actual orientation 930 or the actual angular displacements 940 of the payload support 140 can be used to select among the multiple solutions to Eq. 1. For example, the solution with the smallest deviation from the actual orientation 930 or the actual angular displacements 940 among the multiple solutions may be chosen as the target angular displacements 950.

The methods shown in FIG. 9, FIG. 10A and FIG. 10B may be carried out during continuous use of the apparatus 100, or upon powering the apparatus 100. The combination of the orientations of the base 110 and the payload support 140 may have significant changes, e.g., from the combination of FIG. 1A to the combination of FIG. 7 during use or between uses. These methods allow powering the apparatus at any combination of orientations.

The methods disclosed herein may be performed by computer system by executing with one or more processors instructions recorded on a non-transitory computer readable medium. Such instructions may be read into a transitory memory from the non-transitory computer readable medium before being executed. Execution of the instructions causes the one or more processors to perform the methods described herein.

The term "computer readable medium" as used herein refers to any medium that participates in providing instructions to the processors for execution. Such a medium may take many forms, including but not limited to, non-volatile media, volatile media, and transmission media. Non-volatile media include, for example, optical or magnetic disks and solid state memory. Volatile media include dynamic memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 11:
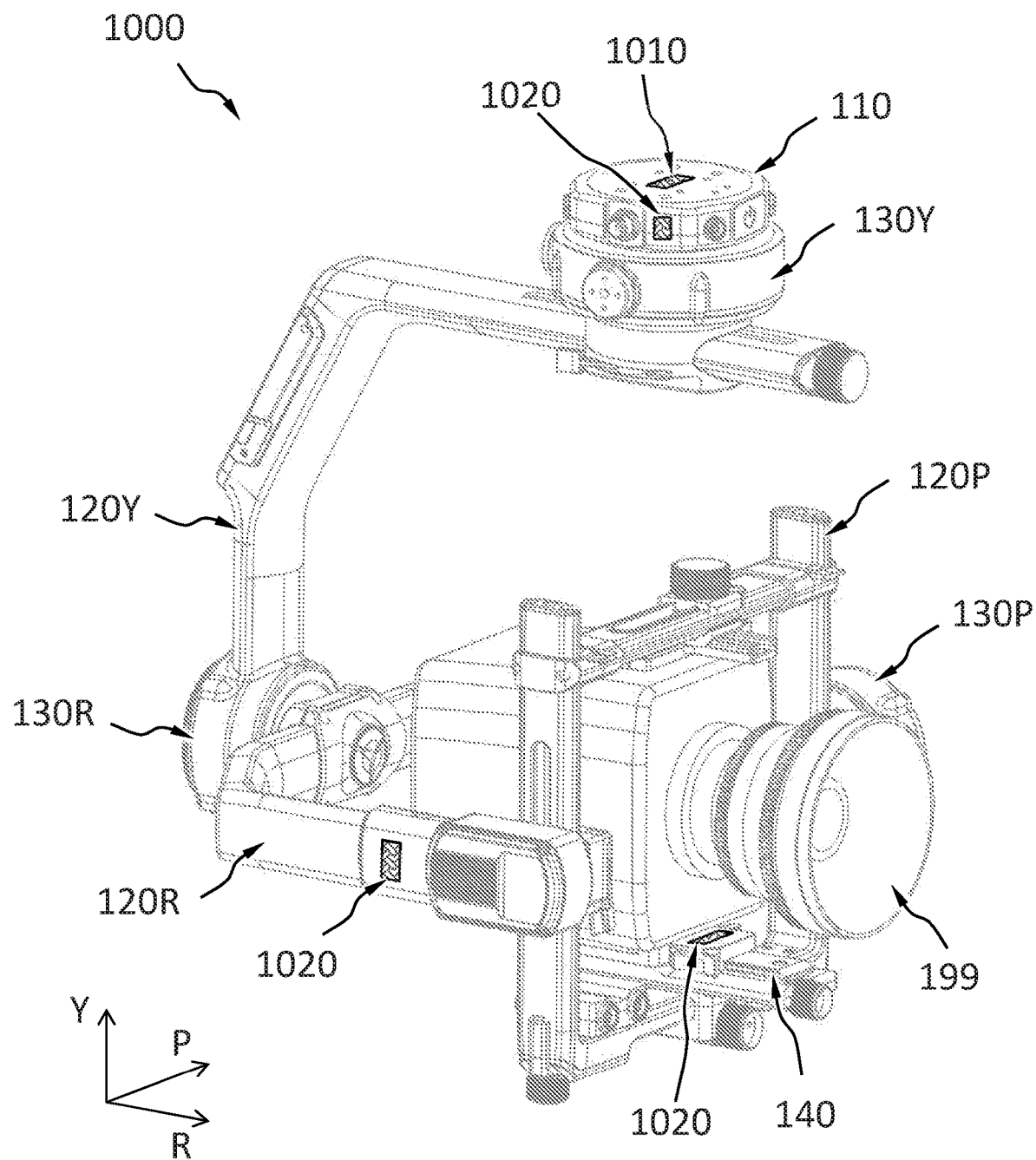
FIG. 11 schematically shows a system, according to an embodiment.

FIG. 11 schematically shows a system 1000, according to an embodiment. The system 1000 includes inertial sensors 1020. The inertial sensors 1020 may be mounted to a portion of an apparatus (e.g., the apparatus 100). In an example where the inertial sensors 1020 are mounted to the apparatus 100, the portion may be the base 110, the payload support 140, or the pivoted supports 120. The inertial sensors 1020 are configured to measure characteristics of movement of the portion. The system 1000 also includes one or more processors 1010 configured to determine an actual orientation of a base of the apparatus using data from the inertial sensors 1020, configured to determine a target orientation of a payload support of the apparatus, and configured to determine target angular displacements of the payload support about gimbal axes of a plurality of pivoted supports of the apparatus, based on the actual orientation of the base and the target orientation of the payload support, where the payload support is mounted to the base through the pivoted supports.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   determining an actual orientation of a base of an apparatus;
   obtaining a target orientation of a payload support of the apparatus; and
   determining target angular displacements of the payload support about gimbal axes of a plurality of pivoted supports of the apparatus, based on the actual orientation of the base and the target orientation of the payload support;
   wherein the payload support is mounted to the base through the plurality of pivoted supports.

2. The method of claim 1, wherein the actual orientation of the base is relative to a reference orientation of the base.

3. The method of claim 1, wherein determining the target angular displacements of the payload support is further based on a reference orientation of the base, wherein the reference orientation of the base was obtained at a time earlier than determining the actual orientation of the base.

4. The method of claim 3, wherein the reference orientation of the base and the actual orientation of the base differ by more than 45 degrees, more than 90 degrees, or more than 135 degrees, about an axis.

5. The method of claim 1, further comprising:
   determining an actual orientation of the payload support;
   wherein determining the target angular displacements is further based on the actual orientation of the payload support.

6. The method of claim 5, wherein determining the target angular displacements of the payload support comprises transforming the actual orientation of the payload support with a non-identity function.

7. The method of claim 6, wherein the non-identity function is a linear function.

8. The method of claim 5, wherein determining the actual orientation of the payload support is based on signals of inertial sensors, the inertial sensors comprising at least one of an accelerometer or a gyroscope.

9. The method of claim 1, further comprising:
   determining actual angular displacements of the payload support about the gimbal axes;
   wherein determining the target angular displacements is further based on the actual angular displacements.

10. The method of claim 9, wherein determining the target angular displacements comprises determining an actual orientation of the payload support based on the actual angular displacements and the actual orientation of the base.

11. The method of claim 9, wherein determining the target angular displacements of the payload support comprises transforming the actual angular displacements of the payload support with a non-identity function.

12. The method of claim 1, wherein determining the actual orientation of the base is based on signals of inertial sensors, the inertial sensors comprising at least one of an accelerometer or a gyroscope.

13. The method of claim 1, wherein determining the actual orientation of the base is based on an actual orientation of the payload support and actual angular displacements of the payload support about the gimbal axes.

14. The method of claim 1, wherein the plurality of pivoted supports include three pivoted supports, the gimbal axes of the three pivoted supports being mutually orthogonal.

15. The method of claim 1, wherein the base is configured to be mounted to a handle assembly comprising a handle configured to be held by a person's hand.

16. The method of claim 1, wherein the target orientation of the payload support is determined upon powering the apparatus.

17. The method of claim 1, wherein the base is configured to be mounted on a vehicle.

18. The method of claim 1, wherein the payload support is configured to support a camera.

19. The method of claim 1, further comprising changing the target orientation of the payload support.

20. The method of claim 1, further comprising rotating the pivoted supports to the target angular displacements of the payload support.

21. The method of claim 1, wherein determining the target angular displacements of the payload support comprises at least one of:
   transforming the target orientation of the payload support with a non-identity function,
   transforming the actual orientation of the base with the non-identity function, or
   transforming the target angular displacements of the payload support with the non-identity function.

22. The method of claim 21, wherein the non-identity function is a linear function.

* * * * *